United States Patent
Yang et al.

(10) Patent No.: US 10,038,571 B2
(45) Date of Patent: Jul. 31, 2018

(54) METHOD FOR READING AND WRITING FORWARDING INFORMATION BASE, AND NETWORK PROCESSOR

(71) Applicant: Huawei Technologies Co., Ltd., Shenzhen (CN)

(72) Inventors: Sheng Yang, Shenzhen (CN); Wumao Chen, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 416 days.

(21) Appl. No.: 15/013,456

(22) Filed: Feb. 2, 2016

(65) Prior Publication Data

US 2016/0224603 A1 Aug. 4, 2016

(30) Foreign Application Priority Data

Feb. 2, 2015 (CN) .......................... 2015 1 0054368

(51) Int. Cl.
*G06F 17/00* (2006.01)
*H04L 12/413* (2006.01)
(Continued)

(52) U.S. Cl.
CPC ...... *H04L 12/413* (2013.01); *G06F 17/30495* (2013.01); *H04L 12/18* (2013.01);
(Continued)

(58) Field of Classification Search
None
See application file for complete search history.

(56) References Cited

U.S. PATENT DOCUMENTS 7,003,582 B2 2/2006 Basso et al.
7,603,346 B1 * 10/2009 Depelteau ......... G06F 17/30961
(Continued)

FOREIGN PATENT DOCUMENTS

CN 101155123 B 6/2011

OTHER PUBLICATIONS

Baboescu et al. "A tree based router search engine architecture with single port memories". Jun. 2005. IEEE. 32nd International Symposium on Computer Architecture, 2005. DOI: 10.1109/ISCA.2005. 7. INSPEC Accession No. 8605273. Print ISBN: 0-7695-2270-X. URL Link: https://ieeexplore.ieee.org/document/1431551/. Accessed May 2018.*

(Continued)

*Primary Examiner* — Neveen Abel Jalil
*Assistant Examiner* — Irene Baker
(74) *Attorney, Agent, or Firm* — Conley Rose, P.C.

(57) ABSTRACT

A method for reading and writing a forwarding information base, including receiving a write an associated data (AD) request used to modify the AD and a write a keyword (Key) request used to modify the Key corresponding to the AD, and before the write AD request and the write Key request pass through a cache, transforming, when any one stage to be read and written includes the Key, a row address in the write AD request into a row address that is same as a row address of a node block on which the Key is located, or transforming, when any one stage to be read and written does not include the Key, a row address in the write AD request and a row address in the write Key request into a same row address in the any one stage.

10 Claims, 9 Drawing Sheets

(51) Int. Cl.

| | | |
|---|---|---|
| H04L 12/28 | (2006.01) | |
| H04L 12/701 | (2013.01) | |
| H04L 12/18 | (2006.01) | |
| H04L 12/46 | (2006.01) | |
| H04L 12/761 | (2013.01) | |
| G06F 17/30 | (2006.01) | |
| H04L 12/751 | (2013.01) | |

(52) U.S. Cl.
CPC .............. *H04L 12/28* (2013.01); *H04L 12/46* (2013.01); *H04L 45/00* (2013.01); *H04L 45/02* (2013.01); *H04L 45/16* (2013.01)

(56) References Cited

U.S. PATENT DOCUMENTS

| | | | |
|---|---|---|---|
| 8,036,126 B2 | 10/2011 | Shaikh et al. | |
| 2003/0091043 A1* | 5/2003 | Mehrotra | ................ H04L 45/00 370/389 |
| 2003/0123397 A1* | 7/2003 | Lee | ...................... H04L 45/742 370/256 |
| 2004/0052251 A1 | 3/2004 | Mehrotra et al. | |
| 2006/0056412 A1* | 3/2006 | Page | ...................... H04L 45/02 370/392 |
| 2015/0172191 A1* | 6/2015 | Wang | ................... H04L 45/748 370/392 |

OTHER PUBLICATIONS

Basu et al. "Fast Incremental Updates for Pipelined Forwarding Engines". Jun. 27, 2005. IEEE/ACM Transactions on Networking, vol. 13, No. 3. DOI: 10.1109/TNET.2005.850216. INSPEC Accession No. 8519894. URL Link: https://ieeexplore.ieee.org/document/1458774/. Accessed May 2018.*

Gharachorloo. "Memory Consistency Models for Shared-Memory Multiprocessors". Dec. 1995. Western Research Laboratory (WRL) Research Report 95/9. Accessed May 2018.*

Giladi. "Network Processors". Aug. 29, 2008. Morgan Kaufmann. ISBN—13: 978-0-12-370891-5. pp. 183-239. Accessed May 2018.*

Giladi. "Network Processors". Aug. 29, 2008. Morgan Kaufmann. ISBN—13: 978-0-12-370891-5. pp. 314-335. Accessed May 2018.*

Koc et al. "Reducing Off-Chip Memory Access Costs Using Data Recomputation in Embedded Chip Multi-processors". Jun. 2007. Design Automation Conference, 2007. 44th ACM/IEEE. INSPEC Accession No. 9866939. Print ISBN: 978-1-59593-627-1. URL Link: https://ieeexplore.ieee.org/document/4261176/. Accessed May 2018.*

Liu, et al.,"Fast Incremental FIB aggregation (FIFA)", Proceedings IEEE INFOCOM, Apr. 14-19, 2013, 39 pages.

Machine Translation and Abstract of Chinese Publication No. CN101155123, Jun. 1, 2011, 19 pages.

Foreign Communication From a Counterpart Application, Chinese Application No. 201510054368.0, Chinese Office Action dated May 3, 2017, 5 pages.

* cited by examiner

A network processor NP receives a write AD request used to modify AD and a write Key request used to modify a Key corresponding to the AD, where the write AD request and the write Key request are sent by a central processing unit CPU of a network device on which the network processor NP is located, the write AD request carries a row address of a node block on which the AD is located, the write Key request carries a row address of a node block on which the Key is located, and the row address of the node block on which the Key is located and the row address of the node block on which the AD is located are not in a same stage ⟶ 201

When any one stage is to be read and written, and before the write AD request and the write Key request pass through a cache, the NP transforms, when the any one stage to be read and written includes the Key, the row address in the write AD request into a row address that is the same as the row address of the node block on which the Key is located; or the NP transforms, when the any one stage to be read and written does not include the Key, the row address in the write AD request and the row address in the write Key request into a same row address in the any one stage, so as to read and write the any one stage according to the same row address ⟶ 202

FIG. 2

METHOD FOR READING AND WRITING FORWARDING INFORMATION BASE, AND NETWORK PROCESSOR

CROSS-REFERENCE TO RELATED APPLICATION

This application claims priority to Chinese Patent Application No. 201510054368.0, filed on Feb. 2, 2015, which is hereby incorporated by reference in its entirety.

TECHNICAL FIELD

The present disclosure relates to the field of communications technologies, and in particular, to a method for reading and writing a forwarding information base, and a network processor.

BACKGROUND

A forwarding information base (FIB) is to provide, in data communication, a network device (for example, a bridge, a switch, or a router) with an information base for forwarding a data packet to a destination address. The forwarding information base is stored in a network processor (NP) of network hardware. Reference may be made to FIG. 1 for a schematic structural diagram of the forwarding information base. The FIB uses a binary search tree (Btree) structure, where each non-empty node is corresponding to one FIB entry. In the Btree structure, except nodes in the last branch, nodes in other branches may be referred to as non-leaf nodes and are used to store keywords (Key), for example, Internet Protocol (IP) addresses, and the nodes in the last branch may be referred to as leaf nodes and are used to store associated data (AD) corresponding to the non-leaf nodes, for example, next-hop IP addresses or port numbers, so as to forward a data packet to a next-hop network device according to the FIB and a destination address in the data packet.

Generally, some FIB entries are stored in an on-chip memory of the network processor, and the other entries including the leaf nodes are stored in an off-chip memory of the network processor. Some consecutive branches in the Btree that are stored in the on-chip memory or the off-chip memory may be one stage. For example, two consecutive branches may be one stage, or three consecutive branches may be one stage. Referring to the schematic structural diagram shown in FIG. 1, the off-chip memory may store n+1 stages with sequence numbers being from 0 to n. In any stage, F nodes in the stage are stored in storage space corresponding to a same storage address, and the F nodes may be referred to as one node block. As shown in FIG. 1, there may be a plurality of node blocks in one stage. In any stage, node blocks may be numbered from right to left, where the sequence number may be referred to as a row address of a node block. A storage address of any node block is corresponding to one row address of the node block.

When a Key and its corresponding AD in the FIB need to be modified because of a change in a network topology due to addition or removal of a network device, nodes of each stage need to be read and written and responses need to be returned. A maintenance operation sequence exists between a Key and AD: When a Key to be modified and its corresponding AD are not in a same stage, a central processing unit (CPU) of a network device first sends, to the NP, a write AD request that carries a tag and is used to modify the AD, for example, a write AD request that carries a post tag, and then sends a write Key request that does not carry a post tag and is used to modify the Key. The post tag may be used to indicate that a stage n is temporarily not read and written according to the write AD request after a stage (n−1) has been read and written, but the write AD request is temporarily saved after a response to the write AD request is returned to notify the NP that the stage (n−1) has been read and written, so as to wait for completely executing, according to the write Key request, an operation of modifying the Key, and the write AD request is triggered to execute modification of AD in the stage n only after the stage (n−1) has been read and written and a response to the write Key request is returned to notify the NP that the stage (n−1) has been read and written, so that both Key modification and AD modification are executed in a process in which a Btree is read and written according to the write Key request.

Generally, because of a low processing speed of the off-chip memory and a long period for a single search for the FIB, a cache may be added between the NP and the off-chip memory to solve the problem of a low processing speed of the off-chip memory.

After the cache is added, when any off-chip stage is read and written, a command sent by a CPU of a network device needs to be sent to the off-chip memory using the cache. There is a plurality of first-in-first-out message queues in the cache, commands for performing operations on nodes corresponding to a row address of a same node block are stored in a same message queue, and commands in different message queues are scheduled in turn according to a scheduling mechanism, and responses are returned to a processor of the NP, so as to notify the processor of the NP that a current stage has been read and written. A command corresponding to a row address of a same node block indicates that the command is a command for nodes in a node block corresponding to the row address. When a Key to be modified and its corresponding AD are not in a same stage and a row address of a node block on which the Key is located is different from a row address of a node block on which the AD is located, a write Key request and a write AD request are not in a same message queue. If a message queue in which the write Key request is located is scheduled before a message queue in which the write AD request is located, it is possible that a response to the write Key request after a current stage has been read and written is returned before a response to the write AD request after the current stage has been read and written. Certainly, it is also possible that a response to the write Key request after a stage (n−1) has been read and written is returned before a response to the write AD request after the stage (n−1) has been read and written. Therefore, the response to the write Key request returned after the stage (n−1) has been read and written cannot be used to trigger the write AD request to modify AD in the stage n, and Key modification and AD modification cannot be executed in a same process in which a Btree is read and written according to the write Key request. As a result, in terms of time, a modified Key and AD that has not been modified are found according to a route search request sent after the write Key request. That is, in a case in which a Key and its corresponding AD cannot be modified synchronously, a Key and AD in a route search result do not match, so that an error in the route search result occurs, thereby causing an error in data packet forwarding.

SUMMARY

Embodiments of the present disclosure provide a method for reading and writing a forwarding information base, and a network processor, which can solve a problem of a route search error in the prior art that is caused when a non-leaf node and a corresponding leaf node cannot be modified synchronously because responses to commands that are sent to a cache cannot be returned in sequence.

To achieve the foregoing objectives, the following technical solutions are used in the embodiments of the present disclosure.

According to a first aspect, a method for reading and writing a FIB is provided, where the FIB is of a Btree structure and includes a non-leaf node and a leaf node, the non-leaf node is used to store a Key, the leaf node is used to store AD corresponding to the Key, a storage location of the FIB includes an on-chip memory and an off-chip memory, the off-chip memory stores n+1 stages with sequence numbers being from 0 to n, each stage includes k branches of nodes, n is an integer greater than or equal to 0, k is a positive integer, and nodes corresponding to a same storage address in each stage are one node block, and the method includes receiving, by a NP, a write AD request used to modify the AD and a write Key request used to modify the Key corresponding to the AD, where the write AD request and the write Key request are sent by a CPU of a network device on which the NP is located, the write AD request carries a row address of a node block on which the AD is located, the write Key request carries a row address of a node block on which the Key is located, and the row address of the node block on which the Key is located and the row address of the node block on which the AD is located are not in a same stage, and when any one stage is to be read and written, and before the write AD request and the write Key request pass through a cache, transforming, when the any one stage to be read and written includes the Key, the row address in the write AD request into a row address that is the same as the row address of the node block on which the Key is located, or transforming, when the any one stage to be read and written does not include the Key, the row address in the write AD request and the row address in the write Key request into a same row address in the any one stage, so as to read and write the any one stage according to the same row address.

With reference to the first aspect, in a first possible implementation manner of the first aspect, when any one stage with a sequence number being m is to be read and written and m is greater than or equal to 0 and less than or equal to n, the transforming, when the any one stage to be read and written does not include the Key, the row address in the write AD request and the row address in the write Key request into a same row address in the any one stage includes: shifting, by the NP, the row address of the node block on which the AD is located in the write AD request by $k*(n-m)$ bits to the right to obtain a right-shifted row address in the write AD request, and storing, in a register, the last $k*(n-m)$ bits of the row address of the node block on which the AD is located, and replacing, by the NP, the row address in the write Key request with the right-shifted row address in the write AD request, and saving, in the register, the row address, in the write Key request before replacement, of the node block on which the Key is located.

With reference to the first aspect or the first possible implementation manner of the first aspect, in a second possible implementation manner of the first aspect, the method further includes when the any one stage has been read and written and an AD response to the write AD request and a Key response to the write Key request are returned, restoring, by the NP, the row address in the write AD request and the row address in the write Key request that are obtained after transformation, so as to transform the row address in the write AD request and the row address in the write Key request into a same row address in a next stage according to the row addresses that are before transformation.

With reference to the second possible implementation manner of the first aspect, in a third possible implementation manner of the first aspect, the restoring, by the NP, the row address in the write AD request and the row address in the write Key request that are obtained after transformation includes: reading, by the NP, the last $k*(n-m)$ bits, stored in the register after right-shifting, of the row address of the node block on which the AD is located, and restoring, according to the last $k*(n-m)$ bits of the row address of the node block on which the AD is located, the right-shifted row address in the write AD request into the row address, before right-shifting, of the node block on which the AD is located, and reading, by the NP, the row address, stored in the register before replacement, of the node block on which the Key is located, and restoring, according to the row address, before replacement, of the node block on which the Key is located, the row address after replacement in the write Key request into the row address, before replacement, of the node block on which the Key is located.

With reference to the second possible implementation manner of the first aspect, in a fourth possible implementation manner of the first aspect, the method further includes if a stage to be read and written includes the Key, executing, by the NP when the row address of the node block on which the Key is located is read and written, the write Key request to modify the Key, and if a response for reading and writing the stage with a sequence number being n−1 is returned and the row address that is obtained after transformation in the write AD request is restored into the row address, before transformation, of the node block on which the AD is located, triggering, by the NP, execution of the write AD request when the Key response is returned, so as to modify the AD in the stage with a sequence number being n.

According to a second aspect, a network processor is provided, where a FIB on the network processor is of a Btree structure and includes a non-leaf node and a leaf node, the non-leaf node is used to store a keyword Key, the leaf node is used to store associated data AD corresponding to the Key, a storage location of the FIB includes an on-chip memory and an off-chip memory, the off-chip memory stores n+1 stages with sequence numbers being from 0 to n, each stage includes k branches of nodes, n is an integer greater than or equal to 0, k is a positive integer, and nodes corresponding to a same storage address in each stage are one node block, and the network processor includes a receiving unit configured to, when a row address of a node block on which the Key is located and a row address of a node block on which the AD is located are not in a same stage, receive a write AD request used to modify the AD and a write Key request used to modify the Key corresponding to the AD, where the write AD request and the write Key request are sent by a CPU of a network device on which the network processor is located, the write AD request carries the row address of the node block on which the AD is located, the write Key request carries the row address of the node block on which the Key is located, and the row address of the node block on which the Key is located and the row address of the node block on which the AD is located are not in a same stage, and a transforming unit configured to, when any one stage is to be read and written, and before the write AD request and the write Key request pass through a cache, transform, when the any one stage to be read and written includes the Key, the row address in the write AD request into a row address that is the same as the row address of the node block on which the Key is located, or transform, when the any one stage to be read and written does not include the Key, the row address in the write AD request and the row address in the write Key request into a same row address in the any one stage, so as to read and write the any one stage according to the same row address.

With reference to the second aspect, in a first possible implementation manner of the second aspect, the transforming unit is further configured to shift the row address of the node block on which the AD is located in the write AD request by k*(n−m) bits to the right to obtain a right-shifted row address in the write AD request, and replace the row address in the write Key request with the right-shifted row address in the write AD request. The network processor further includes a storage unit configured to after the transforming unit shifts the row address of the node block on which the AD is located in the write AD request by k*(n−m) bits to the right to obtain the right-shifted row address in the write AD request, store the last k*(n−m) bits of the row address of the node block on which the AD is located, and after the transforming unit replaces the row address in the write Key request with the right-shifted row address in the write AD request, store the row address, in the write Key request before replacement, of the node block on which the Key is located.

With reference to the second aspect or the first possible implementation manner of the second aspect, in a second possible implementation manner of the second aspect, the network processor further includes a restoring unit configured to, when the any one stage has been read and written and an AD response to the write AD request and a Key response to the write Key request are returned, restore the row address in the write AD request and the row address in the write Key request that are obtained after transformation, so as to transform the row address in the write AD request and the row address in the write Key request into a same row address in a next stage according to the row addresses that are before transformation.

With reference to the second possible implementation manner of the second aspect, in a third possible implementation manner of the second aspect, the restoring unit is further configured to read the last k*(n−m) bits, stored in the storage unit after right-shifting, of the row address of the node block on which the AD is located, and restore, according to the last k*(n−m) bits of the row address of the node block on which the AD is located, the right-shifted row address in the write AD request into the row address, before right-shifting, of the node block on which the AD is located, and read the row address, stored in the storage unit before replacement, of the node block on which the Key is located, and restore, according to the row address, before replacement, of the node block on which the Key is located, the row address after replacement in the write Key request into the row address, before replacement, of the node block on which the Key is located.

With reference to the second possible implementation manner of the second aspect, in a fourth possible implementation manner of the second aspect, the network processor further includes a modifying unit configured to, if a stage to be read and written includes the Key, execute, when the row address of the node block on which the Key is located is read and written, the write Key request to modify the Key, and if a response for reading and writing the stage with a sequence number being n−1 is returned and the row address that is obtained after transformation in the write AD request is restored into the row address, before transformation, of the node block on which the AD is located, trigger execution of the write AD request when the Key response is returned, so as to modify the AD in the stage with a sequence number being n.

According to the method for reading and writing a forwarding information base and the network processor provided in the embodiments of the present disclosure, in a case in which a row address of a node block on which a Key to be modified and a row address of a node block on which AD corresponding to the Key to be modified are not in a same stage, when any one stage is to be read and written, before a write AD request and a write Key request pass through a cache, and when the any one stage to be read and written includes the Key, the row address in the write AD request is transformed into a row address that is the same as the row address of the node block on which the Key is located, or when the any one stage to be read and written does not include the Key, the row address in the write AD request and the row address in the write Key request are transformed into a same row address in the any one stage, so as to read and write the any one stage according to the same row address. This can ensure that a write AD request and a write Key request that are sent to a cache in sequence can be saved in a queue corresponding to a same row address and then can be scheduled in sequence, and responses can be returned in sequence, so that a response to a write Key request for reading and writing a stage (n−1) is not returned before a response to a write AD request for reading and writing the stage (n−1), and then, the write AD request may, after the response to the write AD request is returned, wait for the response to the write Key request to be returned, so as to be triggered by the response to the write Key request to modify AD in a stage n, and therefore, the write AD request can be executed in a process in which a Btree is read and written according to the write Key request, thereby ensuring that a Key of a non-leaf node and AD of a corresponding leaf node can be modified synchronously. This avoids a problem of a route search error in the prior art that is caused when a non-leaf node and a corresponding leaf node cannot be modified synchronously because responses to commands that are sent to a cache cannot be returned in sequence.

BRIEF DESCRIPTION OF DRAWINGS

To describe the technical solutions in the embodiments of the present disclosure or in the prior art more clearly, the following briefly introduces the accompanying drawings required for describing the embodiments or the prior art. The accompanying drawings in the following description show merely some embodiments of the present disclosure, and a person of ordinary skill in the art may still derive other drawings from these accompanying drawings without creative efforts.

FIG. 2 is a flowchart of a method for reading and writing a forwarding information base according to an embodiment of the present disclosure;

DESCRIPTION OF EMBODIMENTS

The following clearly describes the technical solutions in the embodiments of the present disclosure with reference to the accompanying drawings in the embodiments of the present disclosure. The described embodiments are merely some but not all of the embodiments of the present disclosure. All other embodiments obtained by a person of ordinary skill in the art based on the embodiments of the present disclosure without creative efforts shall fall within the protection scope of the present disclosure.

Figure 1:
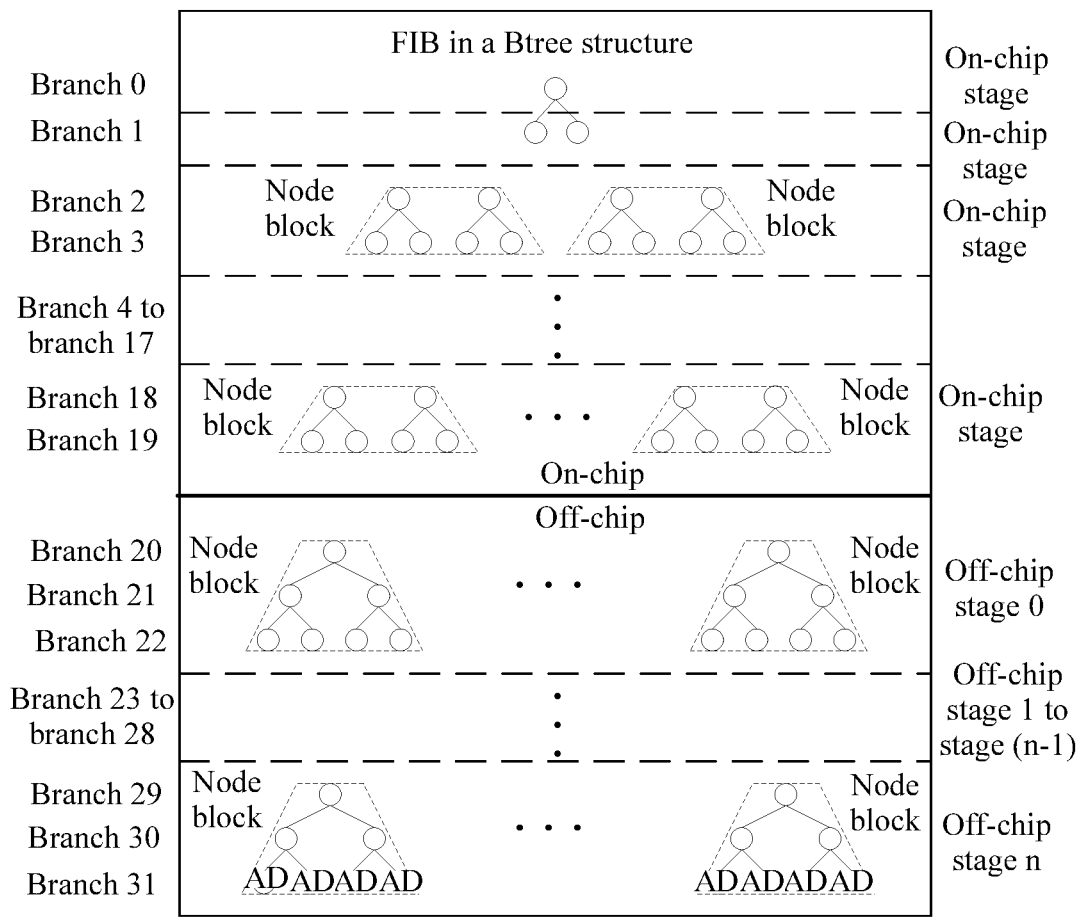
FIG. 1 is a structural diagram of a forwarding information base using a Btree structure in the prior art.

As shown in FIG. 1, in an FIB using a Btree structure, one parent node in a Btree has two child nodes, that is, a child node on the left and a child node on the right, where the nodes may be empty or non-empty, each non-empty node is corresponding to one FIB entry and is used to store route-related information, for example, an IP address may be stored. In the Btree structure, nodes are grouped into a plurality of branches, nodes may be numbered from right to left in each branch, and the sequence number may be referred to as a node address of a node. Nodes in k branches may be classified into one stage, where k herein is a positive integer; quantities k of branches included in different stages may be same or different. For example, any one stage may include two branches of nodes or three branches of nodes. In this embodiment of the present disclosure, a quantity of branches of nodes that are specifically included in any one stage is not limited. In any one stage, F nodes are stored in storage space corresponding to a same storage address, and the F nodes may be referred to as one node block. The node block still retains a parent-child relationship between the nodes in the Btree. That is, one parent node block may also have two child node blocks, that is, a child node block on the left and a child node block on the right, storage addresses of node blocks are numbered from right to left in any one stage, and the sequence number may be referred to as a row address of a node block. For example, a row address of a node block may be represented in a binary form as 0000 0000, 0000 0001, 0000 0010, or the like. Certainly, the row address of the node block is not limited to be represented by an 8-bit binary number. A specific quantity of bits and their representation form are not limited herein. When k is 1, one stage in the Btree is corresponding to one branch.

For example, it is assumed that storage space corresponding to each storage address in an off-chip memory can store data of 256 bits, for a 32-bit IP address, the 256 bits may include six nodes in two branches, as shown by a node block in an on-chip stage (a stage stored in an on-chip memory) shown in FIG. 1, or the 256 bits may include seven nodes in three branches, as shown by a node block in an off-chip stage (a stage stored in an off-chip memory) shown in FIG. 1. If the 256 bits include seven nodes in three branches, the seven nodes actually use only one address of an external memory and are corresponding to a row address of one node block, and the row address of the node block is the same as a node address of a topmost node in the three branches. Furthermore, if one node block includes the foregoing seven nodes in three branches, one node is in the first branch of the node block, two nodes are in the second branch, four nodes are in the third branch, and a node address of the node in the first branch is the same as a row address of the node block.

In a range-based FIB search engine, an IP address in an FIB entry is stored on a node in a numeric value form, and there is a strict value relationship between a parent node and two child nodes, that is, a child node on the left and a child node on the right. In a Btree structure, except nodes in the last branch, nodes in other branches may be referred to as non-leaf nodes and are used to store Keys. The nodes in the last branch may be referred to as leaf nodes and are used to store AD corresponding to the non-leaf nodes. There is a grandparent-grandchild or parent-child relationship between a Key and its corresponding AD. A non-leaf node stores an IP address, and associated data stored on a leaf node is port information or a next-hop IP address required for forwarding a data packet. For example, during a route search, a value corresponding to a destination IP address in a data packet is compared with a value corresponding to an IP address on a root node of a Btree, so as to determine a next child node, and each stage of the Btree is sequentially searched in this manner until a leaf node in the last stage is found, so as to find a next-hop IP address, a port number, or the like for forwarding the data packet.

A network device, such as a router, a switch, or a bridge, in a communications system may include a CPU and a NP of the network device. The NP is a programmable component, and may perform a route search by using a route search command and according to an FIB stored on the NP. The FIB is a mirror of forwarding information included in an IP routing table, and may provide the network device, such as a bridge, a switch, or a router, with an information base for forwarding a data packet to a destination address. When a route or a topology in a network changes, the IP routing table is updated, and such a change is also reflected in the FIB. The CPU of the network device may control, according to the change in the route or the topology in the network, the NP in a timely manner to update the FIB.

An embodiment of the present disclosure provides a method for reading and writing a forwarding information base, where the forwarding information base FIB is of a Btree structure and includes a non-leaf node and a leaf node, the non-leaf node is used to store a keyword Key, the leaf node is used to store associated data AD corresponding to the Key, the FIB is stored in an on-chip memory and an off-chip memory, the off-chip memory stores n+1 stages with sequence numbers being from 0 to n, each stage includes k branches of nodes, n is an integer greater than or equal to 0, k is a positive integer, and nodes corresponding to a same storage address in each stage are one node block. Referring to FIG. 2, main steps of the method may be as follows:

Step 201. A NP receives a write AD request used to modify the AD and a write Key request used to modify the Key corresponding to the AD, where the write AD request and the write Key request are sent by a CPU of a network device on which the network processor NP is located, the write AD request carries a row address of a node block on which the AD is located, the write Key request carries a row address of a node block on which the Key is located, and the row address of the node block on which the Key is located and the row address of the node block on which the AD is located are not in a same stage.

Step 202. When any one stage is to be read and written, and before the write AD request and the write Key request pass through a cache, the NP transforms, when the any one stage to be read and written includes the Key, the row address in the write AD request into a row address that is the same as the row address of the node block on which the Key is located, or the NP transforms, when the any one stage to be read and written does not include the Key, the row address in the write AD request and the row address in the write Key request into a same row address in the any one stage, in order to read and write the any one stage according to the same row address.

Because AD of a leaf node is located in the last branch of a Btree, the leaf node is located in the last stage of the Btree. When a Key of a non-leaf node and its corresponding AD of a leaf node are in a same stage, that is, the last stage in the off-chip memory of the NP, that is, a stage n, because there is a grandparent-grandchild or parent-child relationship between a Key and its corresponding AD in a same stage, the Key and its corresponding AD are corresponding to a storage address of a same node block, and therefore have a same row address of the same stage. A row address of a node block may be understood as a sequence number of a storage address corresponding to the node block, and a storage address of each node block may be obtained by means of calculation according to a row address of the node block. In this case, the CPU of the network device may send a read and write request to the NP, in order to instruct the NP to modify a Key and its corresponding AD in a same row address in the off-chip stage n. Reading and writing are started from a root node of the Btree according to the read and write request, all on-chip and off-chip stages are sequentially read and written, and when the off-chip stage n is read and written, the Key and its corresponding AD in this stage are modified.

After all on-chip stages have been read and written according to the write AD request and the write Key request, when an off-chip stage is read and written, a detection circuit in the NP may determine, according to a branch number in the write AD request or the write Key request, whether the AD or Key to be modified exists in a stage to be read and written. If it is determined that the AD or Key to be modified exists in the stage to be read and written, the write AD request or the write Key request is executed to modify the corresponding AD or Key, and a response to the write AD request or a response to the write Key request is returned to the processor of the NP, such that the processor of the NP sends the write AD request or the write Key request to a detection circuit of a next stage for detection, or if it is determined that the AD or Key to be modified does not exist in the stage to be read and written, a response to the write AD request or a response to the write Key request is returned to the processor of the NP, such that the processor of the NP sends the write AD request or the write Key request to a detection circuit of a next stage for detection, so as to read and write the next stage.

When the row address of the node block on which the Key is located and the row address of the node block on which the AD is located are not in a same stage, in step 201, the NP receives a write AD request that carries a tag, for example, a write AD request that carries a Post tag, and receives a write Key request that does not carry a Post tag, where the write AD request and the write Key request are sent in turn by the CPU of the network device, and all on-chip and off-chip stages are sequentially read and written from a root node of the Btree according to the two requests. When a stage to be read and written includes the Key to be modified, the write Key request is executed to modify the corresponding Key. When a stage to be read and written includes the AD to be modified, the write AD request is executed to modify the corresponding AD.

After all on-chip stages have been read and written, the write AD request and the write Key request may be sent to the off-chip memory of the NP using a cache, in order to read and write stages in the off-chip memory. After any one stage of an off-chip stage 0 to an off-chip stage (n−1) has been read and written, the cache returns a response to the write AD request and a response to the write Key request to the processor of the NP, in order to notify the processor of the NP that a current stage has been read and written, such that the processor of the NP sends the write AD request and the write Key request to a next stage for reading and writing, where the write AD request may be returned by being carried in the response to the write AD request, and the write Key request may be returned by being carried in the response to the write Key request. After the last off-chip stage n has been read and written, the cache returns a response to the write AD request and a response to the write Key request to the processor of the NP and the CPU of the network device, in order to notify them that an operation of modifying the AD and modifying the Key has been completed. In any one off-chip stage to be read and written, when the row address in the write AD request and the row address in the write Key request are not a same row address in a same stage, a scheduling mechanism of the cache causes that responses to commands that are sent to the cache in sequence may not be returned in sequence, and therefore a response to the write Key request may be returned to the NP before a response to the write AD request, such that when the response to the write Key request is returned, the write AD request cannot be triggered to modify the corresponding AD.

Therefore, in step 202, when the off-chip stage 0 to the off-chip stage n are to be read and written, and when any one stage to be read and written includes the Key, in this embodiment of the present disclosure, the row address in the write AD request is transformed into a row address that is the same as the row address of the node block on which the Key is located, or when any one stage to be read and written does not include the Key, in this embodiment of the present disclosure, the row address in the write AD request and the row address in the write Key request are transformed into a same row address in the any one stage, in order to read and write the any one stage according to the same row address. In this way, in the any one stage, for the write AD request and the write Key request that are transformed into the same row address, a response to the write AD request that is sent first can be returned first, and a response to the write Key request that is sent later can be returned later. Therefore, it may be ensured that the response to the write AD request can be returned before the response to the write Key request in the stage (n−1), such that the write AD request can be triggered, after the response to the write Key request is returned, to modify corresponding AD in the stage n, which enables the write AD request to be executed in a process in which the Btree is read and written according to the write Key request, thereby ensuring that the Key and its corresponding AD can be modified synchronously.

According to the method for reading and writing a forwarding information base provided in this embodiment of the present disclosure, in a case in which a row address of a node block on which a Key to be modified is located and a row address of a node block on which AD corresponding to the Key to be modified is located are not in a same stage, when any one stage is to be read and written, before a write AD request and a write Key request pass through a cache, and when the any one stage to be read and written includes the Key, the row address in the write AD request is transformed into a row address that is the same as the row address of the node block on which the Key is located, or when the any one stage to be read and written does not include the Key, the row address in the write AD request and the row address in the write Key request are transformed into a same row address in the any one stage, in order to read and write the any one stage according to the same row address. This can ensure that a write AD request and a write Key request that are sent to a cache in sequence can be saved in a queue corresponding to a same row address and then can be scheduled in sequence, and responses can be returned in sequence, such that a response to a write Key request for reading and writing a stage (n−1) is not returned before a response to a write AD request for reading and writing the stage (n−1), and then, the write AD request may, after the response to the write AD request is returned, wait for the response to the write Key request to be returned, in order to be triggered by the response to the write Key request to modify AD in a stage n, and therefore, the write AD request can be executed in a process in which a Btree is read and written according to the write Key request, thereby ensuring that a Key of a non-leaf node and AD of a corresponding leaf node can be modified synchronously. This avoids a problem of a route search error in the prior art that is caused when a non-leaf node and a corresponding leaf node cannot be modified synchronously because responses to commands that are sent to a cache cannot be returned in sequence.

Figure 3:
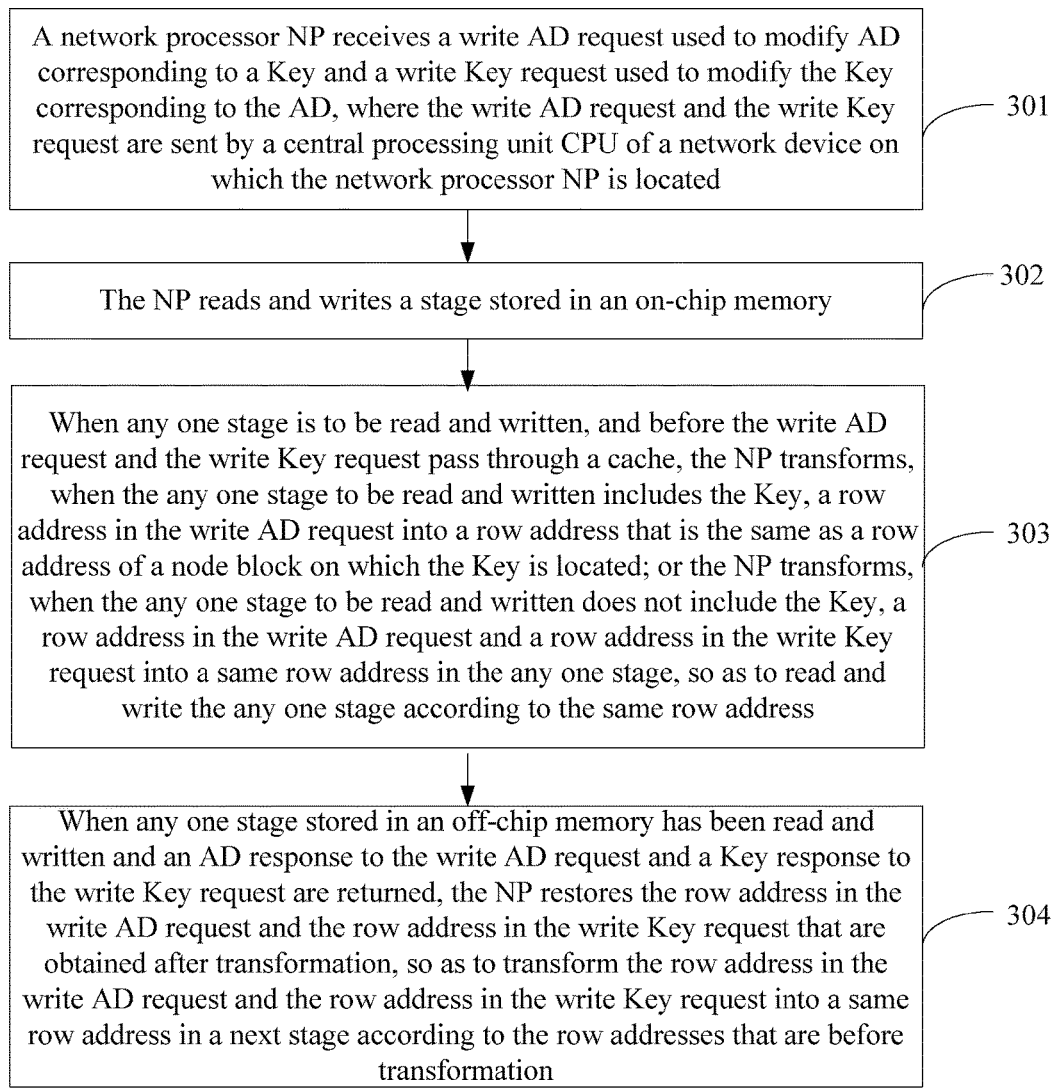
FIG. 3 is a flowchart of a method for reading and writing a forwarding information base according to another embodiment of the present disclosure.

Referring to FIG. 3, an embodiment of the present disclosure provides a method for reading and writing a forwarding information base, where the FIB is of a Btree structure. Reference may be made to the foregoing embodiment for a specific structure of the FIB. When a row address of a node block on which a Key is located and a row address of a node block on which AD is located are not in a same stage, the method provided in this embodiment of the present disclosure may include:

Step 301. A NP receives a write AD request used to modify AD corresponding to a Key and a write Key request used to modify the Key corresponding to the AD, where the write AD request and the write Key request are sent by a CPU of a network device on which the network processor NP is located.

Because the FIB may provide a network device, such as a bridge, a switch, or a router, with information, such as a next-hop IP address or a port number, required for forwarding a data packet to a destination address, when a route or a topology in a network changes, the CPU in the network device may control the NP in a timely manner to modify the FIB. Because an FIB entry is stored in a form of a node in a Btree, modifying the FIB means modifying a node corresponding to an FIB entry. Moreover, because in the FIB, a Key of a non-leaf node is corresponding to AD of a leaf node, the Key and its corresponding AD need to be modified synchronously during node modification. Otherwise, it may be caused that during a route search, a next-hop IP address or a port number that is corresponding to an original IP address in the Key before the modification and that is included in the AD before the modification is found according to a new IP address in the Key after the modification, which causes a route search error, and further causes an error when the network device forwards a data packet.

When a row address of a node block on which the Key is located and a row address of a node block on which the AD is located are not in a same stage, to prevent a route search request from being affected when the Key and its corresponding AD are modified, and to avoid that a Key and AD that are found according to a route search request are not corresponding, in step 301, the CPU of the network device modifies, by sending a maintenance operation sequence, a Key and its corresponding AD that are located in different stages. The maintenance operation sequence may include the CPU of the network device first sends, to the NP, a write AD request that carries a tag and is used to modify AD, for example, a write AD request that carries a post tag, and then sends, to the NP, a write Key request that does not carry a post tag and is used to modify a Key corresponding to the AD. The Post tag in the write AD request may be used to indicate that a stage n is temporarily not read and written according to the write AD request after a stage (n−1) has been read and written, but the write AD request is temporarily saved after a response to the write AD request is returned to notify the NP that the stage (n−1) has been read and written, in order to wait for completely executing, according to the write Key request, an operation of modifying the Key, and the write AD request is triggered to execute modification of AD in the stage n only after the stage (n−1) has been read and written and a response to the write Key request is returned to notify the NP that the stage (n−1) has been read and written, in order to modify AD in an off-chip stage n. This may ensure that the Key and its corresponding AD are modified synchronously, without affecting a route search result. Furthermore, the write AD request carries information such as the row address of the node block on which the AD to be modified is located, a number of a branch in which the AD to be modified is located, and modified data of the node block on which the AD to be modified is located, and the write Key request carries information such as the row address of the node block on which the Key to be modified is located, a number of a branch in which the Key to be modified is located, and modified data of the node block on which the Key to be modified is located. A stage in which the AD or Key to be modified is located and a specific node block on which the AD or Key to be modified is located may be determined according to row addresses and branch numbers in the write AD request and the write Key request. The modified data of the node block on which the AD or Key to be modified is located includes data of F nodes in the node block on which the Key is located, and may be used to modify and replace an entire node block on which the AD to be modified or the Key to be modified is located, in order to modify the AD or Key to be modified. Except that data on a node on which the AD or Key to be modified is located is modified data, data in remaining F−1 nodes is still original data.

Step 302. The NP reads and writes a stage stored in an on-chip memory.

After step 301, the NP controls the write AD request and the write Key request, in order to sequentially read and write stages of the on-chip memory (that is, stages stored in the on-chip memory) and stages of an off-chip memory (that is, stages stored in the off-chip memory) from a root node to the last stage n in the off-chip memory, and responses are returned to a processor in the NP after any one stage has been read and written.

Because the AD to be modified in the write AD request is in the last off-chip stage, the write AD request is not executed in a process of reading and writing on-chip stages. Before any one on-chip stage is read and written according to the write Key request, a detection circuit in the NP may determine, according to a branch number in the write Key request, whether the Key to be modified exists in a stage to be read and written. If it is determined that the Key to be modified exists in the stage to be read and written, the write Key request is executed to modify the corresponding Key, or if it is determined that the Key to be modified does not exist in the stage to be read and written, a next stage is read and written.

After the stages stored in the on-chip memory has been read and written according to the write AD request and the write Key request, when an off-chip stage is read and written, a detection circuit that is in the NP and that is corresponding to each off-chip stage may determine, according to a branch number in the write AD request or the write Key request, whether the AD or Key to be modified exists in a stage to be read and written. If it is determined that the AD or Key to be modified exists in the stage to be read and written, the write AD request or the write Key request is executed to modify the corresponding AD or Key, or if it is determined that the AD or Key to be modified does not exist in the stage to be read and written, a response to the write AD request or a response to the write Key request is returned to the processor of the NP, such that the processor of the NP sends the write AD request or the write Key request to a next stage, so as to read and write the next stage. Stages with sequence numbers being 0 to n described in the following indicate off-chip stages if they are not denoted as on-chip or off-chip.

Step 303. When any one stage is to be read and written, and before the write AD request and the write Key request pass through a cache, the NP transforms, when the any one stage to be read and written includes the Key, the row address in the write AD request into a row address that is the same as the row address of the node block on which the Key is located, or the NP transforms, when the any one stage to be read and written does not include the Key, the row address in the write AD request and the row address in the write Key request into a same row address in the any one stage, so as to read and write the any one stage according to the same row address.

The write AD request and the write Key request that are sent by the CPU of the network device to the NP may be sent to a stage in the off-chip memory using the cache. A plurality of first-in-first-out message queues exists in the cache, and commands for operations performed on nodes corresponding to a row address of a same node block are stored in a same message queue. When any one off-chip stage is read and written, commands sent to the cache are stored in different message queues according to different row addresses, and commands in the message queues are scheduled in turn according to a scheduling mechanism of the cache and responses are returned to the processor of the NP.

Exemplarily, within a current clock cycle, if a write AD request for reading and writing any one off-chip stage is stored in a message queue 0 of the cache, a write Key request that is sent later is stored in a message queue 5, and a route search command that is sent after the write Key request is stored in a message queue 6. In addition, there are message queues 1, 2, 3, 4, 7, 8, 9, and the like. According to the scheduling mechanism of the cache, if a command in the message queue 3 is to be scheduled in this clock cycle, a command in the message queue 4 is to be scheduled in a second clock cycle, a write Key request command in the message queue 5 is to be scheduled in a third clock cycle, a route search command in the message queue 6 is to be scheduled in a fourth clock cycle, commands in the message queues 7, 8, and 9 are scheduled in turn in fifth to seventh clock cycles, and then the write AD request in the message queue 0 can be scheduled in an eighth clock cycle. It may be learned that, the write AD request that is sent to the cache first may be scheduled later, and the write Key request that is sent to the cache later may be scheduled first. Correspondingly, a response to the write Key request is returned to the processor of the NP before a response to the write AD request. Therefore, after a stage (n−1) is read and written, if the response to the write AD request is returned to the processor of the NP after the response to the write Key request, the write AD request cannot be triggered by the response to the write Key request to modify corresponding AD in a stage n. In this case, a modified Key and AD that has not been modified are found according to the route search command, that is, the Key and the AD cannot be modified synchronously. As a result, an IP address of the Key and a next-hop IP address or a port number of the AD that are found by means of a route search do not match, which causes a route search error, such that an error occurs when a data packet is forwarded.

In other words, for commands sent to different row addresses of a same stage, the scheduling mechanism of the cache causes that responses to commands that are sent to the cache in sequence may not be returned in sequence. Because a message queue corresponding to each row address is a first-in-first-out message queue, when the cache schedules the message queue, a command that is sent to the message queue first is scheduled first. That is, for commands sent to a same row address of a same stage, responses to commands that are sent to the cache in sequence are returned in sequence to the processor of the NP.

Therefore, in step 303, when any one of stages with sequence numbers being from 0 to n is to be read and written, before the write AD request and the write Key request pass through the cache, and when the any one stage to be read and written includes the Key, the row address in the write AD request may be transformed into a row address that is the same as the row address of the node block on which the Key is located, or when the any one stage to be read and written does not include the Key, the row address in the write AD request and the row address in the write Key request may be transformed into a same row address in the any one stage, in order to read and write the any one stage according to the same row address. In this way, in the any one stage, for the write AD request and the write Key request that are transformed into the same row address, a response to the write AD request that is sent first can be returned first, and a response to the write Key request that is sent later can be returned later. Therefore, it may be ensured that after a stage (n−1) has been read and written, the response to the write AD request can be returned before the response to the write Key request, such that the write AD request carried in the response to the write AD request may be temporarily saved, and waits to be triggered by the response to the write Key request that is returned later, in order to modify corresponding AD in the stage n, which enables the write AD request to be executed in a process in which the Btree is read and written according to the write Key request, thereby ensuring that the Key and its corresponding AD can be modified synchronously. This can avoid a problem of a route search error in the prior art that is caused when a non-leaf node and a corresponding leaf node cannot be modified synchronously because responses to commands that are sent to a cache cannot be returned in sequence.

It should be noted that when the row address of the node block on which the Key is located and the row address of the node block on which the AD is located are not in a same stage, that is, in a case in which the row address of the node block on which the Key is located is not in the stage n, because when the stage n is to be read and written, operations of modifying the corresponding Key and triggering execution of write AD request have been completed according to the write Key request, it does not need to ensure that responses to the write AD request and the write Key request are returned in sequence. Therefore, when the stage n is read and written, the row address in the write Key request may not be transformed, and no impact is caused regardless of any row address in the write Key request.

When a stage to be read and written includes the Key to be modified, because the corresponding Key needs to be modified according to the row address of the node block on which the Key is located, the row address in the write Key request cannot be changed. In this case, if the row address in the write AD request and the row address in the write Key request are to be transformed into a same row address, the row address in the write AD request may be transformed into a row address that is the same as the row address of the node block on which the Key is located.

When a stage to be read and written includes the AD to be modified, that is, when the stage n is to be read and written, because the corresponding AD needs to be modified according to the row address of the node block on which the AD is located, the row address in the write AD request cannot be changed. In this case, if the row address in the write Key request and the row address in the write AD request are to be transformed into a same row address, the row address in the write Key request may be transformed into a row address that is the same as the row address of the node block on which the AD is located.

Furthermore, when step 303 is implemented, if quantities k of branches of nodes included in different off-chip stages are the same, when any one stage with a sequence number being m is to be read and written and m is greater than or equal to 0 and less than or equal to n, when the any one stage to be read and written does not include the Key, an implementation manner for transforming the row address in the write AD request and the row address in the write Key request into a same row address in the any one stage is as follows: the NP shifts the row address of the node block on which the AD is located in the write AD request by $k*(n-m)$ bits to the right to obtain a right-shifted row address in the write AD request, and stores, in a register, the last $k*(n-m)$ bits of the row address of the node block on which the AD is located; and the NP replaces the row address in the write Key request with the right-shifted row address in the write AD request, and stores, in the register, the row address, in the write Key request before replacement, of the node block on which the Key is located.

Furthermore, it is assumed that one branch is one stage, for a node located in a $p^{th}$ branch in the Btree, there are two child nodes and a row address corresponding to the two child nodes in a $(p+1)^{th}$ branch, a row address of the nodes in the $(p+1)^{th}$ branch that are shifted by one bit to the right are a row address of a parent node in the $p^{th}$ branch. There are $2^2$ grandchild nodes and a row address corresponding to the $2^2$ grandchild nodes in a $(p+2)^{th}$ branch, and a row address of the nodes in the $(p+2)^{th}$ branch that are shifted by one bit to the right are the row address of the parent nodes in the $(p+1)^{th}$ branch, and the row address of the nodes in the $(p+2)^{th}$ branch that are shifted by two bits to the right are the row address of the ancestor node in the $p^{th}$ branch, and for a $(p+q)^{th}$ branch that is q branches away from the $p^{th}$ branch, there are a total of $2^q$ grandchild nodes and a row address corresponding to the $2^q$ grandchild nodes, and a row address of the nodes in the $(p+q)^{th}$ branch that are shifted by q bits to the right are the row address of the ancestor node in the $p^{th}$ branch. Likewise, for a node block of any one off-chip stage in the Btree, if quantities k of branches of nodes included in different off-chip stages are the same, that is, each node block includes $2^{k-1}$ nodes, for a node block in an $m^{th}$ stage, there are $2^q$ grandchild node blocks and a row address corresponding to the $2^q$ grandchild node blocks in an $(m+q)^{th}$ stage, and a row address of the node blocks in the stage that are shifted by $k*q$ bits to the right are a row address of an ancestor node block in the $m^{th}$ branch.

Therefore, when the any one stage to be read and written does not include the Key, when the row address in the write AD request and the row address in the write Key request are transformed into the same row address in the any one stage, before the NP reads and writes any one stage with a sequence number being m, the row address of the node block on which the AD is located in the write AD request may be shifted by $k*(n-m)$ bits to the right. In this case, the row address in the write AD request is transformed into the row address of the ancestor node block of the node block on which the AD is located in the stage m. Meanwhile, the last $k*(n-m)$ bits of the row address of the node block on which the AD is located may be stored in a register, so as to restore the row address in the write AD request according to the row address, stored in the register, of the node block on which the AD is located. Certainly, the NP may also store, in the register, a complete row address of the node block on which the AD is located before right-shifting. This embodiment of the present disclosure sets no limitation thereto.

It should be noted that if quantities k of branches of nodes included in different off-chip stages are different, when a stage m is to be read and written, the row address in which the AD is located in the write AD request may be shifted by d bits to the right according to an interval d between a quantity of branches of nodes in the topmost branch in a stage n and a quantity of branches of nodes in the topmost branch in the stage m (m is less than n), in order to obtain a right-shifted row address in the write AD request, that is, the row address of the node block on which the ancestor node block of the AD is located in the stage m.

Further, after the last $k*(n-m)$ bits of the row address of the node block on which the AD is located are stored in the register, the row address in the write Key request may be replaced with the right-shifted row address in the write AD request, such that the row address in the write AD request and the row address in the write Key request are transformed into a same row address in a same stage. Then, the row address, in the write Key request before replacement, of the node block on which the Key is located may be stored in the register, so as to restore the row address in the write Key request according to the row address, stored in the register, of the node block on which the Key is located.

In addition, because the node on which the Key to be modified is located is corresponding to the node on which the AD is located, during a route search, if the node on which the Key is located is hit, the node on which the AD is located can be definitely hit according to a correspondence between the Key and the AD in the Btree, in order to find a next-hop egress. That is, the node on which the Key is located is definitely a grandparent node or a parent node of the node on which the AD is located, and a grandparent-grandchild relationship or a parent-child relationship exists between the node block on which the Key is located and the node block on which the AD is located. Therefore, a node block that is obtained by shifting the row address of the node block on which the AD is located in the write AD request by k*(n−m) bits to the right and is corresponding to the row address in the stage m is a grandparent node block or a parent node block of the node block on which the AD is located, and is also a grandparent node block or a parent node block of the node block on which the Key is located. In other words, a node block that is in the stage m and has a grandparent-grandchild relationship or a parent-child relationship with the node block on which the Key is located and a node block that is in the stage m and has a grandparent-grandchild relationship or a parent-child relationship with the node block on which the AD is located are the same node block. Therefore, their row addresses are the same row address.

Certainly, shifting the row address of the node block on which the AD is located to the right to obtain the right-shifted row address of the write AD request and replacing the row address in the write Key request with the right-shifted row address is only one of methods for transforming the row address in the write AD request and the row address in the write Key request into a same row address in a same stage. A row address in a stage may be specified, and the row addresses in the write AD request and the write Key request may be both transformed into the specified row address, or another row address transformation method may be used. This embodiment of the present disclosure sets no limitation thereto.

It should be noted that when any one stage with a sequence number being m is to be read and written, before the write AD request and the write Key request pass through the cache, and when the any one stage to be read and written includes the Key, a method for shifting the row address of the node block on which the AD is located in the write AD request by k*(n−m) bits to the right may also be used to obtain the right-shifted row address in the write AD request, and the last k*(n−m) bits of the row address of the node block on which the AD is located are stored in the register, for restoration of the row address before transformation. In this case, the right-shifted row address in the write AD request is a row address that is the same as the row address in the write Key request. In addition, alternatively, the row address in the write AD request may be directly replaced with the row address of the node block on which the Key is located, in order to implement that the row address in the write AD request and the row address in the write Key request are transformed into a same row address. This embodiment of the present disclosure sets no limitation on a specific transformation method.

Step 304. When any one stage stored in the off-chip memory has been read and written and an AD response to the write AD request and a Key response to the write Key request are returned, the NP restores the row address in the write AD request and the row address in the write Key request that are obtained after transformation, in order to transform the row address in the write AD request and the row address in the write Key request into a same row address in a next stage according to the row addresses that are before transformation.

Furthermore, because n stages exist in the off-chip memory, it needs to be ensured that responses to the write AD request and the write Key request can be returned in sequence in any one stage of a stage 0 to a stage (n−1), in order to ensure that the response to the write AD request can be returned before the response to the write Key request when the stage (n−1) is read and written, and further ensure that the write Key request may trigger, after the response is returned in the stage (n−1), the write AD request to modify corresponding AD in a stage n. Therefore, to facilitate transformation of the row address in the write AD request and the row address in the write Key request into a same row address in a next stage, after a current stage has been read and written and the AD response to the write AD request and the Key response to the write Key request are returned, the row address that is obtained after transformation in the write AD request may be restored into the row address, before transformation, of the node block on which the AD is actually located, and the row address that is obtained after transformation in the write Key request may be restored into the row address, before transformation, of the node block on which the Key is actually located.

Optionally, that the NP restores the row address in the write AD request and the row address in the write Key request that are obtained after transformation may include that the NP reads the last k*(n−m) bits, stored in the register after right-shifting, of the row address of the node block on which the AD is located, and restores, according to the last k*(n−m) bits of the row address of the node block on which the AD is located, the right-shifted row address in the write AD request into the row address, before right-shifting, of the node block on which the AD is located, and then, the NP reads the row address, stored in the register before replacement, of the node block on which the key is located, and restores, according to the row address, before replacement, of the node block on which the Key is located, the row address after replacement in the write Key request into the row address, before replacement, of the node block on which the Key is located.

That is, the NP may shift back the last k*(n−m) bits, stored in the register, of the row address of the node block on which the AD is located, so as to restore the row address in the write AD request into the row address, before right-shifting, of the node block on which the AD is located; and then, replace the row address after replacement in the write Key request with the row address, stored in the register before replacement, of the node block on which the Key is located, so as to restore the row address in the write Key request into the row address, before replacement, of the node block on which the Key is located.

Certainly, the NP may make a replacement according to a complete row address that is stored in the register and in which the AD is located, in order to restore the row address in the write AD request.

In addition, because the stage n is the last off-chip stage in which the AD is located, when the stage n is to be read and written, the row address in the write AD request is not transformed, and after the stage n has been read and written and an AD response to the write AD request is returned, the row address does not need to be restored, or when the stage n is to be read and written, the row address in the write Key request may be transformed into a row address that is the same as the row address of the node block on which the AD is located, and after the stage n has been read and written and an AD response to the write AD request and a Key response to the write Key request are returned, the Key and its corresponding AD have been modified. Therefore, the row address that is obtained after transformation in the write Key request does not need to be restored.

In addition, in a process of executing step 303 in the foregoing, if a stage to be read and written includes the Key, the NP executes, when the row address of the node block on which the Key is located is read and written, the write Key request to modify the Key, and if a response for reading and writing the stage with a sequence number being n−1 is returned and the row address that is obtained after transformation in the write AD request is restored into the row address, before transformation, of the node block on which the AD is located, the NP triggers execution of the write AD request when the Key response is returned, in order to modify AD in the stage with a sequence number being n.

Further, before an off-chip stage 0 is to be read and written, a bypass tag may be set in the write AD request and the write Key request. When any one of stages with sequence numbers being 0 to n is read and written, a detection circuit corresponding to each off-chip stage in the NP may determine, before the row address in the write Key request is transformed and according to a number of a branch in which the Key in the write Key request is located, whether the stage to be read and written includes the Key. If it is determined that the stage to be read and written includes the Key, the bypass tag is set to 0, and when the row address of the node block on which the Key is located is read and written, the cache sends a command for the write Key request to a stage of an external memory, in order to execute the write Key request to modify the corresponding Key. Otherwise, the bypass tag is set to 1, and when the stage is read and written, the Cache does not send the write Key request to the off-chip stage, so that the write Key request is not actually executed and a Key corresponding to the row address that is obtained after transformation is not modified. In addition, if the Key to be modified is located in the stage 0, before the stage 0 is to be read and written, the bypass tag may not be set in the write Key request, instead, the bypass tag is set after the stage 0 has been read and written, and the bypass tag is set to 1, such that an operation of modifying the Key is not executed according to the write Key request when the stage 1 to the stage n are read and written.

Because the AD is in the stage n, the bypass tag is set to 1 before the stage 0 is to be read and written, such that an operation of modifying the AD is not executed according to the write AD request in a process of reading and writing the stage 0 to the stage (n−1), and when the stage n is to be read and written, the bypass tag in the write AD request is set to 0, such that the write AD request is executed to modify the corresponding AD. Further, after a response for reading and writing the stage with a sequence number being n−1 is returned, and the row address that is obtained after transformation in the write AD request is restored into the row address, before transformation, of the node block on which the AD is located, the NP triggers the execution of the write AD request when the Key response is returned. In this case, the detection circuit may determine, before the row address in the write AD request is transformed and according to a number of a branch in which the AD in the write AD request is located, that the stage to be read and written includes the AD to be modified, and set the bypass tag in the write AD request to 0, so as to execute the write AD request to modify the corresponding AD in the stage n. Therefore, the write AD request can be executed in a process in which the Btree is read and written according to the write Key request, which ensures that the Key and its corresponding AD can be modified synchronously. The NP may perform a route search according to a modified FIB, in order to forward a data packet, which avoids a problem of a route search error in the prior art that is caused when a non-leaf node and a corresponding leaf node cannot be modified synchronously because responses to commands that are sent to a Cache cannot be returned in sequence.

Because the write Key request or the write AD request includes data of nodes of an entire modified node block, when the Key or the AD is modified, all nodes of a node block in a storage address corresponding to the row address in the write Key request or the write AD request are read and replaced, so as to modify the entire node block, including a node on which the Key or AD to be modified is located in the node block.

In addition, a branch number in the write Key request or the write AD request represents a number of a branch of the node on which the Key or AD to be modified is located, and a location tag with a few bits may be used to indicate whether the node on which the Key or AD to be modified is on-chip, or in an off-chip stage 0 or an off-chip stage 1, or any one off-chip stage. For example, when three off-chip stages exist, a 2-bit location tag may be used for representation: 00 represents an on-chip stage, 01 represents an off-chip stage 0, 10 represents an off-chip stage 1, and 11 represents an off-chip stage 2. In this case, an off-chip stage in which the Key or AD to be modified is located may be determined according to the location tag in the write Key request or the write AD request, and a node block on which the Key or AD to be modified is located may be determined according to the row address in the write Key request or the write AD request.

According to the method for reading and writing a forwarding information base provided in this embodiment of the present disclosure, in a case in which a row address of a node block on which a Key to be modified is located and a row address of a node block on which AD corresponding to the Key to be modified is located are not in a same stage, when any one stage is to be read and written, before a write AD request and a write Key request pass through a cache, and when the any one stage to be read and written includes the Key, the row address in the write AD request is transformed into a row address that is the same as the row address of the node block on which the Key is located, or when the any one stage to be read and written does not include the Key, the row address in the write AD request and the row address in the write Key request are transformed into a same row address in the any one stage, in order to read and write the any one stage according to the same row address. This can ensure that a write AD request and a write Key request that are sent to a cache in sequence can be saved in a queue corresponding to a same row address and then can be scheduled in sequence, and responses can be returned in sequence, so that a response to a write Key request for reading and writing a stage (n−1) is not returned before a response to a write AD request for reading and writing the stage (n−1), and then, the write AD request may, after the response to the write AD request is returned, wait for the response to the write Key request to be returned, in order to be triggered by the response to the write Key request to modify AD in a stage n, and therefore, the write AD request can be executed in a process in which a Btree is read and written according to the write Key request, thereby ensuring that a Key of a non-leaf node and AD of a corresponding leaf node can be modified synchronously. This avoids a problem of a route search error in the prior art that is caused when a non-leaf node and a corresponding leaf node cannot be modified synchronously because responses to commands that are sent to a cache cannot be returned in sequence.

In addition, when it needs to be ensured that different Key 1 and Key 2 in two different off-chip stages are modified in sequence, when any one off-chip stage is to be read and written, and before a write Key 1 request and a write Key 2 request pass through a cache, a row address in the write Key 1 request and a row address in the write Key 2 request may be transformed into a same row address in the any one stage, and then the any one stage is read and written according to the same row address, which can ensure that responses to the write Key 1 request and the write Key 2 request that are sent to the cache in sequence can be returned in sequence, thereby ensuring that the Key 1 and the Key 2 can be modified in sequence.

In addition, when commands sent to the cache in sequence are a read AD request, a write AD request, and a write Key request, if an off-chip stage 0 to an off-chip stage (n−1) are to be read and written, because a row address in the read AD request is a row address in a stage n and is different from a row address that is obtained after transformation in the write AD request and the write Key request, after the off-chip stage (n−1) has been read and written, scheduling of the cache may cause that a response to the write AD request may be returned before a response to the read AD request. When the off-chip stage n is to be read and written, because the row address in the read AD request is the same as the row address in the write AD request, after the stage n has been read and written, an operation of modifying AD is executed according to the write AD request, a command for reading the AD is executed according to the read AD request, and responses to the write AD request and the write Key request are returned in sequence. That is, modified AD is probably read according to a read AD command that is sent before the write AD request. In this case, when any one off-chip stage is to be read and written, the row address in the read AD request, the row address in the write AD request, and the row address in the write Key request may be transformed into a same row address in the stage to be read and written, so that responses may be returned in sequence when the any one stage is read and written, which can ensure that AD that has not been modified is read according to a read AD command that is sent before a write AD request, and modified AD is read according to a read AD command that is sent after a write AD request.

Certainly, when any one off-chip stage is to be read and written, row addresses in all commands that are sent to a cache may be transformed into a same row address in the stage to be read and written, so as to read and write the any one stage according to the same row address, such that the commands sent to the cache in sequence can be scheduled in sequence, thereby returning responses in sequence. This embodiment of the present disclosure sets no limitation thereto.

Figure 4:
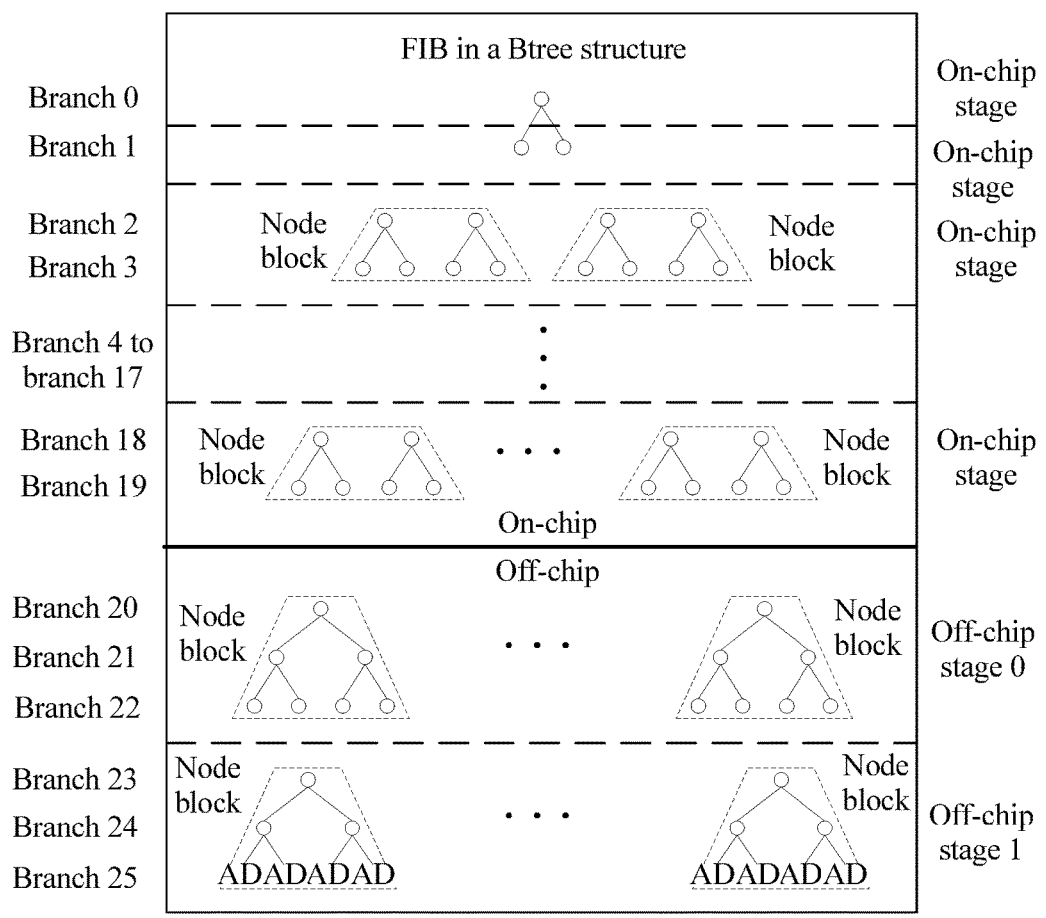
FIG. 4 is a structural diagram of a forwarding information base using a Btree structure according to an embodiment of the present disclosure.

In an embodiment of the present disclosure, a method for reading and writing a FIB is described using an example in which the forwarding information base FIB has two stages, a stage 0 and a stage 1, which are stored in an off-chip memory of an NP, each off-chip stage has three branches of nodes, branch numbers of the off-chip nodes are 20 to 25, nodes in a branch 20 to a branch 22 are located in the stage 0, and nodes in a branch 23 to a branch 25 are located in the stage 1, and a Key to be modified is located in the stage 0. In this embodiment of the present disclosure, the stage 0 and the stage 1 indicate off-chip stages if they are not denoted as on-chip or off-chip, and reference may be made to FIG. 4 for a Btree structure of the FIB. Exemplarily, reference may be made to FIG. 5 for a schematic diagram of a process in which the NP reads and writes the forwarding information base FIB. When a row address of a node block on which a Key is located and a row address of a node block on which AD is located are not in a same stage, referring to FIG. 6, the method for reading and writing a forwarding information base FIB according to this embodiment of the present disclosure may include:

Step 601. The NP receives a write AD request used to modify AD and a write Key request used to modify a Key corresponding to the AD, where the write AD request and the write Key request are sent by a CPU of a network device on which the NP is located.

When a route or a topology in a network changes, the CPU of the network device modifies an FIB entry by controlling the NP to modify a Key of a non-leaf node and its corresponding AD of a leaf node in a Btree synchronously.

When a row address of a node block on which the Key is located and a row address of a node block on which the AD is located are not in a same stage, in step 601, the CPU of the network device first sends, to the NP, a write AD request that carries a post tag and is used to modify the AD corresponding to the Key, and then sends, to the NP, a write Key request that does not carry a post tag and is used to modify the Key. The write AD request carries information such as the row address of the node block on which the AD to be modified is located, a number 25 of a branch in which the AD to be modified is located, and modified data of the node block on which the AD to be modified is located, and the write Key request carries information such as the row address of the node block on which the Key to be modified is located, a number of a branch in which the Key to be modified is located, for example, 20, and modified data of the node block on which the Key to be modified is located. A node block on which the AD or Key to be modified is further located may be determined according to the row address and the branch number in the write AD request or the write Key request, and the modified data of the node block on which the AD or Key to be modified is located may be used to modify and replace an entire node block on which the AD to be modified or the Key to be modified is located, in order to modify the AD or Key to be modified.

Step 602. The NP reads and writes a stage stored in an on-chip memory.

Figure 5:
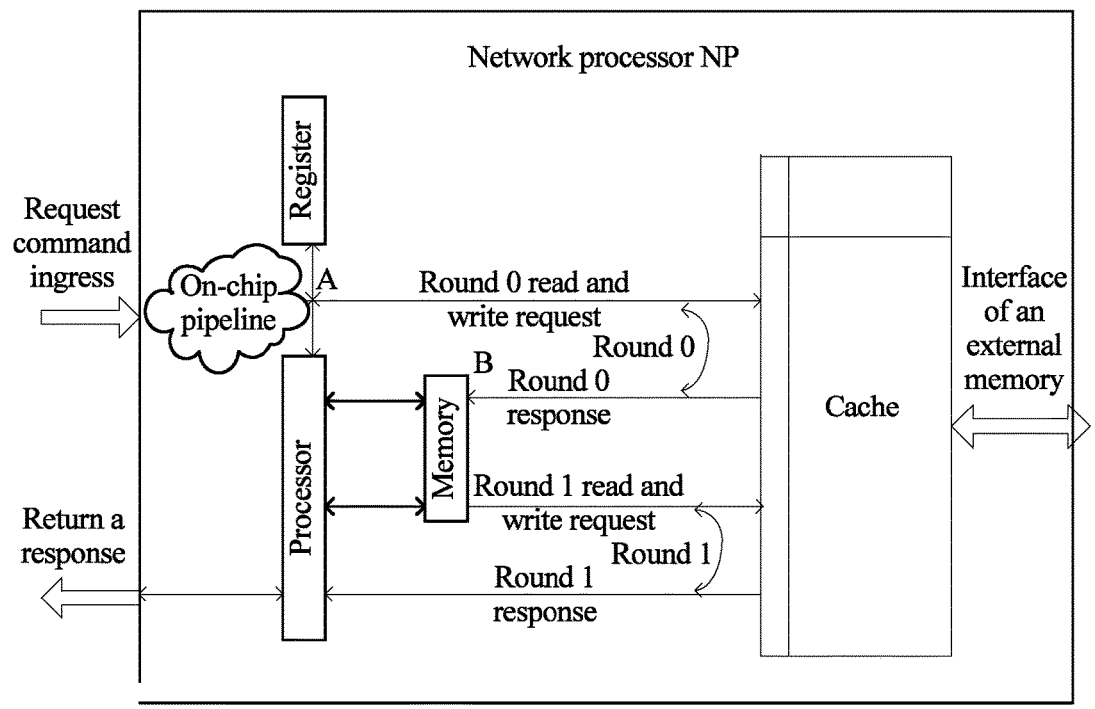
FIG. 5 is a flowchart of a method for reading and writing a forwarding information base according to another embodiment of the present disclosure.
Figure 6:
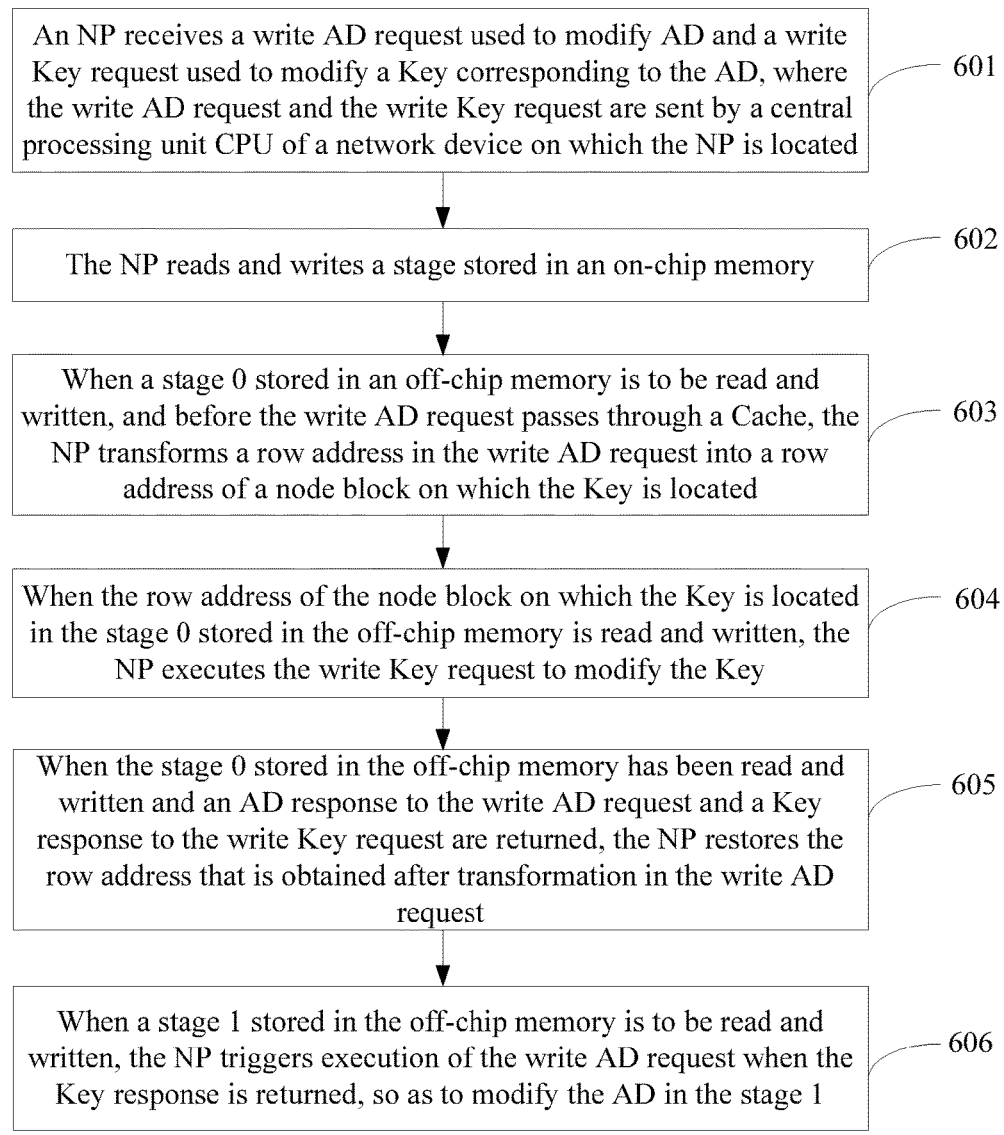
FIG. 6 is a flowchart of a method for reading and writing a forwarding information base according to another embodiment of the present disclosure.

After step 601, the NP controls the write AD request and the write Key request, in order to sequentially read and write all stages in the on-chip memory starting from a root node, that is, pass through an on-chip pipeline shown in FIG. 5, until the last stage 1 in the off-chip memory, and responses are returned to the NP after any one stage has been read and written.

In this embodiment, because the Key to be modified is in the stage 0 of the off-chip memory, the AD to be read and written is in the stage 1 of the off-chip memory, that is, neither is in the on-chip memory, when on-chip stages of the Btree are read and written according to the write AD request and the write Key request, operations of modifying the AD and modifying the Key are not executed. Moreover, because a cache is not used for reading and writing on-chip stages, responses to the write AD request and the write Key request can be returned in sequence.

Step 603. When the stage 0 stored in the off-chip memory is to be read and written, and before the write AD request passes through the cache, the NP transforms the row address in the write AD request into the row address of the node block on which the Key is located.

Because the write AD request and the write Key request that are sent by the CPU of the network device to the NP need to be sent to a stage in the off-chip memory using the cache, referring to FIG. 5, for commands sent to different row addresses of a same stage, a scheduling mechanism of the cache causes that responses to commands that are sent to the cache in sequence may not be returned in sequence, referring to step 303. However, for commands sent to a same row address of a same stage, responses to commands that are sent to the cache in sequence are returned in sequence to a processor of the NP. Because the stage 0 of the off-chip memory includes the Key and the corresponding Key needs to be modified according to the row address of the node block on which the Key is located, the row address in the write Key request cannot be changed. In this case, the row address in the write AD request may be transformed into a row address that is the same as the row address of the node block on which the Key is located. In this way, for the write AD request and the write Key request that have been transformed into the same row address, a response to the write AD request that is sent first can be returned first, and a response to the write Key request that is sent later can be returned later, such that the response to the write AD request can be returned before the response to the write Key request in the stage 0, and when the response to the write Key request is returned, the write AD request can be triggered to modify the corresponding AD in the stage 1.

Exemplarily, before the NP reads and writes the stage 0 in the off-chip memory, the NP may, at a point A in the schematic diagram shown in FIG. 5, first shift the row address of the node block on which the AD is located in the write AD request by three bits to the right to obtain a right-shifted row address in the write AD request, and store, in a register shown in FIG. 5, the last three bits of the row address of the node block on which the AD is located, or the NP may store, in a register, a complete row address of the node block on which the AD is located, where the row address in the write Key request does not need to be transformed. The write AD request or the write Key request is sent from the NP to the cache, so that the write AD request or the write Key request may be sent to the stage 0 in the off-chip memory using the cache, and a response is returned from the cache to the processor of the NP. This process may be referred to as Round 0.

Certainly, shifting the row address of the node block on which the AD is located to the right is only one of methods for transforming a row address. Alternatively, the row address in the write AD request may be directly replaced with the row address of the node block on which the Key is located, in order to implement that the row address in the write AD request and the row address in the write Key request are transformed into a same row address. This embodiment of the present disclosure sets no limitation on a specific method for transforming the row address.

Step 604. When the row address of the node block on which the Key is located in the stage 0 stored in the off-chip memory is read and written, the NP executes the write Key request to modify the Key.

Furthermore, a detection circuit in the NP may determine, according to the number of the branch in which the Key in the write Key request is located, that the stage 0, to be read and written, of the off-chip memory includes the Key. Therefore, the NP executes, when the row address of the node block on which the Key is located is read and written, that is, in a process of Round 0, the write Key request to modify the corresponding Key, and returns a Round 0 response. the detection circuit may determine, before the point A shown in FIG. 5 and according to the number of the branch in which the AD in the write AD request is located and before the row address in the write AD request is transformed, that the stage 0 to be read and written does not include the AD; therefore, a Bypass tag may be set to 1 in the write AD request, such that the NP does not execute an operation of modifying the AD when the stage 0 is read and written, and returns a Round 0 response.

Step 605. When the stage 0 stored in the off-chip memory has been read and written and an AD response to the write AD request and a Key response to the write Key request are returned, the NP restores the row address that is obtained after transformation in the write AD request.

Furthermore, at a point B in the schematic diagram shown in FIG. 5, the NP may shift back the last three bits, stored in the register, of the row address of the node block on which the AD is located, such that the row address in the write AD request is restored into the row address, before right-shifting, of the node block on which the AD is located, and temporarily store, in a memory, the write AD request to which the Round 0 response has been returned, in order to wait for a Round 0 response to the write Key request to be returned and then trigger the write AD request to execute an operation of modifying the AD. Certainly, the NP may make a replacement according to the complete row address that is stored in the register and in which the AD is located before right-shifting, so as to restore the row address in the write AD request.

When the stage 0 of the off-chip memory is to be read and written, because the row address in the write Key request is not transformed, after the stage 0 has been read and written and the response is returned, the row address in the write Key request is the row address of the node block on which the Key is located, and does not need to be restored.

Step 606. When the stage 1 stored in the off-chip memory is to be read and written, the NP triggers execution of the write AD request when the Key response is returned, in order to modify the AD in the stage 1.

The write AD request or the write Key request is sent from the NP to the Cache, so that the write AD request or the write Key request may be sent to the stage 1 in the off-chip memory, and a response is returned from the Cache to the processor of the NP. This process may be referred to as Round 1.

When the stage 1 of the off-chip memory is to be read and written, because the stage 1 does not include the Key to be modified, and the corresponding Key has been modified according to the write Key request when the stage 0 is read and written, that is, in Round 0, and the execution of the write AD request has been triggered to modify the corresponding AD, when the stage 1 is read and written, that is, in Round 1, the write Key request no longer needs to be executed, and it does not need to be ensured that the write AD request and the write Key request are executed in sequence. Therefore, when the stage 1 is to be read and written, the row address in the write Key request may not be transformed, and no impact is caused regardless of any row address in the write Key request.

Furthermore, in step 605, after the row address that is obtained after transformation in the write AD request is restored, at the point B shown in FIG. 5, the detection circuit in the NP may determine, according to the number of the branch in which the AD in the write AD request is located, that the stage 1 to be read and written includes the AD, and therefore, the bypass tag is set to 0. The NP executes the write AD request when the row address of the node block on which the AD is located is read and written, that is, in Round 1, to modify the corresponding AD, and returns a Round 1 response; the detection circuit may determine, according to the number of the branch in which the Key in the write Key request is located, that the stage 1 to be read and written does not include the Key, and therefore, the bypass tag may be set to 1 in the write Key request; and when the stage 1 is read and written, that is, in Round 1, the NP does not send, by using the cache, the write Key request to the off-chip stage 1, does not execute the write Key request, and returns a Round 1 response to the NP and the CPU of the network device, in order to notify the network device that an operation of modifying the Key and its corresponding AD has been completed.

It can be learned from step 603 that, after the stage 0 has been read and written, the response to the write AD request that is sent first can be returned first, and the response to the write Key request that is sent later can be returned later. The response to the write AD request is temporarily saved in the NP after the stage 0 has been read and written and the response to the write AD request is returned, and is triggered, after the response to the write Key request is returned, to execute the write AD request to modify the corresponding AD in the stage 1, such that the write AD request can be executed in a process in which a Btree is read and written according to the write Key request, thereby ensuring that the Key and its corresponding AD can be modified synchronously. This can avoid a problem of a route search error in the prior art that is caused when a non-leaf node and a corresponding leaf node cannot be modified synchronously because responses to commands that are sent to a cache cannot be returned in sequence.

In addition, in a case in which the Key to be modified is located in an on-chip stage, in a process of reading and writing the on-chip stage, the write AD request is not executed, and the detection circuit may determine, according to the branch number in the write Key request, whether the stage to be read and written includes the Key to be modified. If it is determined that the stage to be read and written includes the Key to be modified, the write Key request is executed to modify the corresponding Key, or if it is determined that the stage to be read and written does not include the Key to be modified, a next stage is read and written.

According to the method for reading and writing a forwarding information base provided in this embodiment of the present disclosure, in a case in which a row address of a node block on which a Key to be modified is located and a row address of a node block on which AD corresponding to the Key to be modified is located are not in a same stage, when any one stage is to be read and written, before a write AD request and a write Key request pass through a cache, and when the any one stage to be read and written includes the Key, the row address in the write AD request is transformed into a row address that is the same as the row address of the node block on which the Key is located, or when the any one stage to be read and written does not include the Key, the row address in the write AD request and the row address in the write Key request are transformed into a same row address in the any one stage, in order to read and write the any one stage according to the same row address. This can ensure that a write AD request and a write Key request that are sent to a cache in sequence can be saved in a queue corresponding to a same row address and then can be scheduled in sequence, and responses can be returned in sequence, so that a response to a write Key request for reading and writing a stage (n−1) is not returned before a response to a write AD request for reading and writing the stage (n−1), and then, the write AD request may, after the response to the write AD request is returned, wait for the response to the write Key request to be returned, so as to be triggered by the response to the write Key request to modify AD in a stage n, and therefore, the write AD request can be executed in a process in which a Btree is read and written according to the write Key request, thereby ensuring that a Key of a non-leaf node and AD of a corresponding leaf node can be modified synchronously. This avoids a problem of a route search error in the prior art that is caused when a non-leaf node and a corresponding leaf node cannot be modified synchronously because responses to commands that are sent to a cache cannot be returned in sequence.

Figure 7:
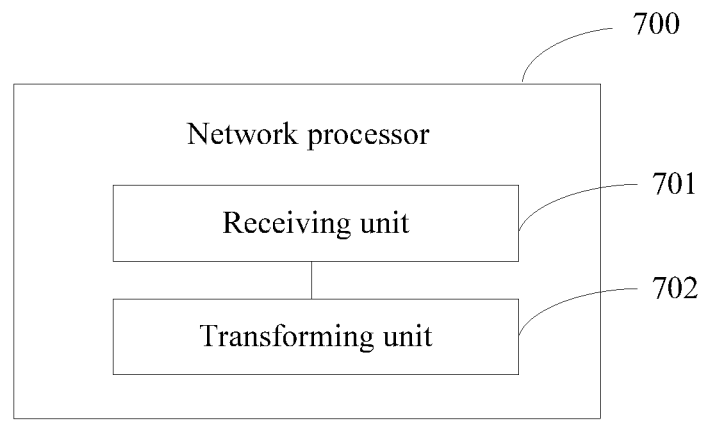
FIG. 7 is a structural diagram of a network processor according to an embodiment of the present disclosure.

An embodiment of the present disclosure provides a network processor 700, where a FIB on the network processor 700 is of a Btree structure and includes a non-leaf node and a leaf node, the non-leaf node is used to store a keyword Key, the leaf node is used to store associated data AD corresponding to the Key, a storage location of the FIB includes an on-chip memory and an off-chip memory, the off-chip memory stores n+1 stages with sequence numbers being from 0 to n, each stage includes k branches of nodes, n is an integer greater than or equal to 0, k is a positive integer, and nodes corresponding to a same storage address in each stage are one node block. Referring to FIG. 7, the network processor 700 may include: a receiving unit 701, which may be configured to receive a write AD request used to modify the AD and a write Key request used to modify the Key corresponding to the AD, where the write AD request and the write Key request are sent by a CPU of a network device on which the network processor 700 is located, the write AD request carries a row address of a node block on which the AD is located, the write Key request carries a row address of a node block on which the Key is located, and the row address of the node block on which the Key is located and the row address of the node block on which the AD is located are not in a same stage, and a transforming unit 702, which may be configured to, when any one stage is to be read and written, and before the write AD request and the write Key request pass through a cache, transform, when the any one stage to be read and written includes the Key, the row address in the write AD request into a row address that is the same as the row address of the node block on which the Key is located, or transform, when the any one stage to be read and written does not include the Key, the row address in the write AD request and the row address in the write Key request into a same row address in the any one stage, in order to read and write the any one stage according to the same row address.

After all on-chip stages have been read and written sequentially according to the write AD request and the write Key request, when an off-chip stage is read and written, a detection circuit that is in the network processor 700 and is corresponding to each off-chip stage may determine, according to a branch number in the write AD request or the write Key request, whether the AD or Key to be modified exists in a stage to be read and written. If it is determined that the AD or Key to be modified exists in the stage to be read and written, the write AD request or the write Key request is sent using the cache to the stage to be read and written, and the write AD request or the write Key request is executed to modify the corresponding AD or Key, or if it is determined that the AD or Key to be modified does not exist in the stage to be read and written, a response to the write AD request or a response to the write Key request is returned to the processor of the network processor 700, such that the processor of the network processor 700 may send the write AD request or the write Key request to a next stage, in order to read and write the next stage.

The cache herein may be a cache with a high speed, if the row addresses in the write AD request and the write Key request are not a same row address in a same stage, a scheduling mechanism of the cache may cause that responses to the write AD request and the write Key request that are sent to the cache in sequence cannot be returned in sequence.

Optionally, the transforming unit 702 may be further configured to: shift the row address of the node block on which the AD is located in the write AD request by k*(n−m) bits to the right to obtain a right-shifted row address in the write AD request, and replace the row address in the write Key request with the right-shifted row address in the write AD request.

Figure 8:
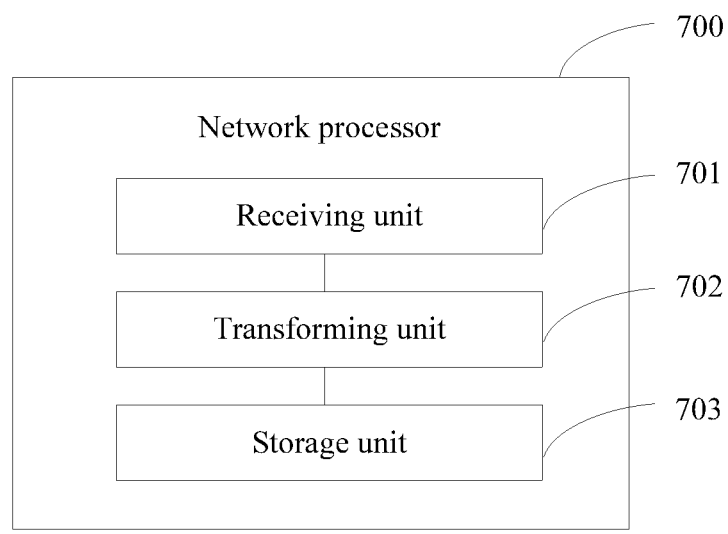
FIG. 8 is a structural diagram of another network processor according to an embodiment of the present disclosure.

Referring to FIG. 8, the network processor 700 may further include a storage unit 703, which may be configured to: after the transforming unit 702 shifts the row address of the node block on which the AD is located in the write AD request by k*(n−m) bits to the right to obtain the right-shifted row address in the write AD request, store the last k*(n−m) bits of the row address of the node block on which the AD is located, and after the transforming unit 702 replaces the row address in the write Key request with the right-shifted row address in the write AD request, store the row address, in the write Key request before replacement, of the node block on which the Key is located.

Figure 9:
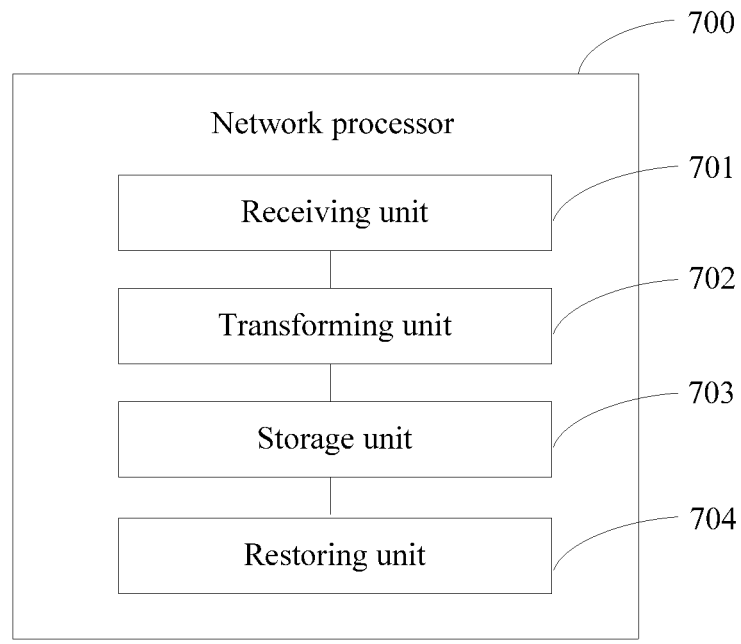
FIG. 9 is a structural diagram of another network processor according to an embodiment of the present disclosure.

Optionally, referring to FIG. 9, the network processor 700 may further include a restoring unit 704, which may be configured to: when the any one stage has been read and written and an AD response to the write AD request and a Key response to the write Key request are returned, restore the row address in the write AD request and the row address in the write Key request that are obtained after transformation, in order to transform the row address in the write AD request and the row address in the write Key request into a same row address in a next stage according to the row addresses that are before transformation.

Optionally, the restoring unit 704 may be further configured to: read the last k*(n−m) bits, stored in the storage unit 703 after right-shifting, of the row address of the node block on which the AD is located, and restore, according to the last k*(n−m) bits of the row address of the node block on which the AD is located, the right-shifted row address in the write AD request into the row address, before right-shifting, of the node block on which the AD is located; and read the row address, stored in the storage unit 703 before replacement, of the node block on which the Key is located, and restore, according to the row address, before replacement, of the node block on which the Key is located, the row address after replacement in the write Key request into the row address, before replacement, of the node block on which the Key is located.

Figure 10:
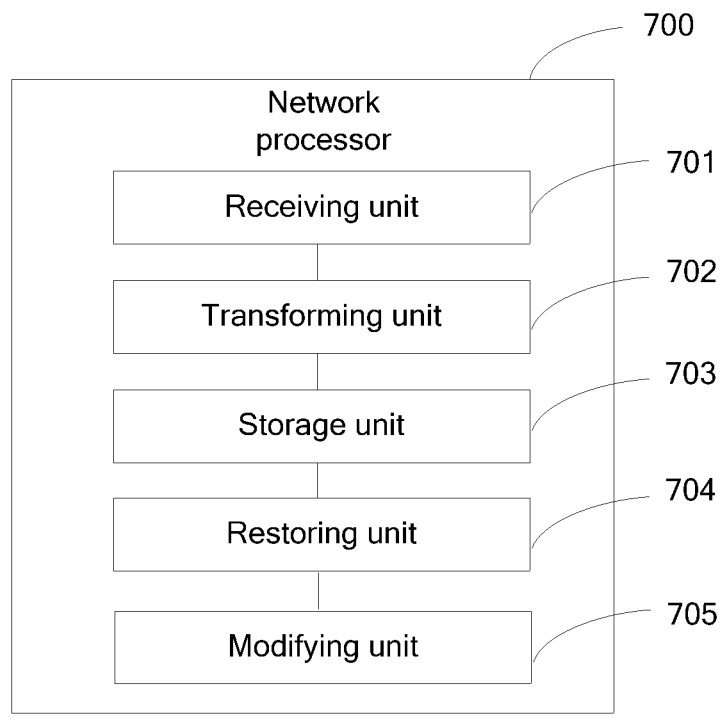
FIG. 10 is a structural diagram of another network processor according to an embodiment of the present disclosure.

Optionally, referring to FIG. 10, the network processor 700 may further include a modifying unit 705, which may be configured to: if a stage to be read and written includes the Key, execute, when the row address of the node block on which the Key is located is read and written, the write Key request to modify the Key, and if a response for reading and writing the stage with a sequence number being n−1 is returned and the row address that is obtained after transformation in the write AD request is restored into the row address, before transformation, of the node block on which the AD is located, trigger execution of the write AD request when the Key response is returned, in order to modify AD in the stage with a sequence number being n.

In addition, when a Key of a non-leaf node and its corresponding AD of a leaf node are in a same stage, that is, a stage n in the off-chip memory of the network processor 700, the Key and its corresponding AD are located on a same node block and are corresponding to a storage address of the same node block. Therefore, the Key and its corresponding AD have a same row address of the same stage. A row address of a node block may be understood as a sequence number of a storage address corresponding to the node block, and a storage address of each node block may be obtained by means of calculation according to a row address of the node block. In this case, the CPU of the network device may send a read and write request to the network processor 700, so as to instruct the network processor 700 to modify a Key and its corresponding AD in a same row address in the off-chip stage n. Reading and writing are started from a root node of the Btree according to the read and write request, all on-chip and off-chip stages are sequentially read and written, and when the off-chip stage n is read and written, the Key and its corresponding AD in this stage are modified.

According to the network processor 700 provided in this embodiment of the present disclosure, in a case in which a row address of a node block on which a Key to be modified is located and a row address of a node block on which AD corresponding to the Key to be modified is located are not in a same stage, when any one stage is to be read and written, before a write AD request and a write Key request pass through a cache, and when the any one stage to be read and written includes the Key, the row address in the write AD request is transformed into a row address that is the same as the row address of the node block on which the Key is located, or when the any one stage to be read and written does not include the Key, the row address in the write AD request and the row address in the write Key request are transformed into a same row address in the any one stage, in order to read and write the any one stage according to the same row address. This can ensure that a write AD request and a write Key request that are sent to a cache in sequence can be saved in a queue corresponding to a same row address and then can be scheduled in sequence, and responses can be returned in sequence, so that a response to a write Key request for reading and writing a stage (n−1) is not returned before a response to a write AD request for reading and writing the stage (n−1), and then, the write AD request may, after the response to the write AD request is returned, wait for the response to the write Key request to be returned, in order to be triggered by the response to the write Key request to modify AD in a stage n, and therefore, the write AD request can be executed in a process in which a Btree is read and written according to the write Key request, thereby ensuring that a Key of a non-leaf node and AD of a corresponding leaf node can be modified synchronously. This avoids a problem of a route search error in the prior art that is caused when a non-leaf node and a corresponding leaf node cannot be modified synchronously because responses to commands that are sent to a cache cannot be returned in sequence.

Figure 11:
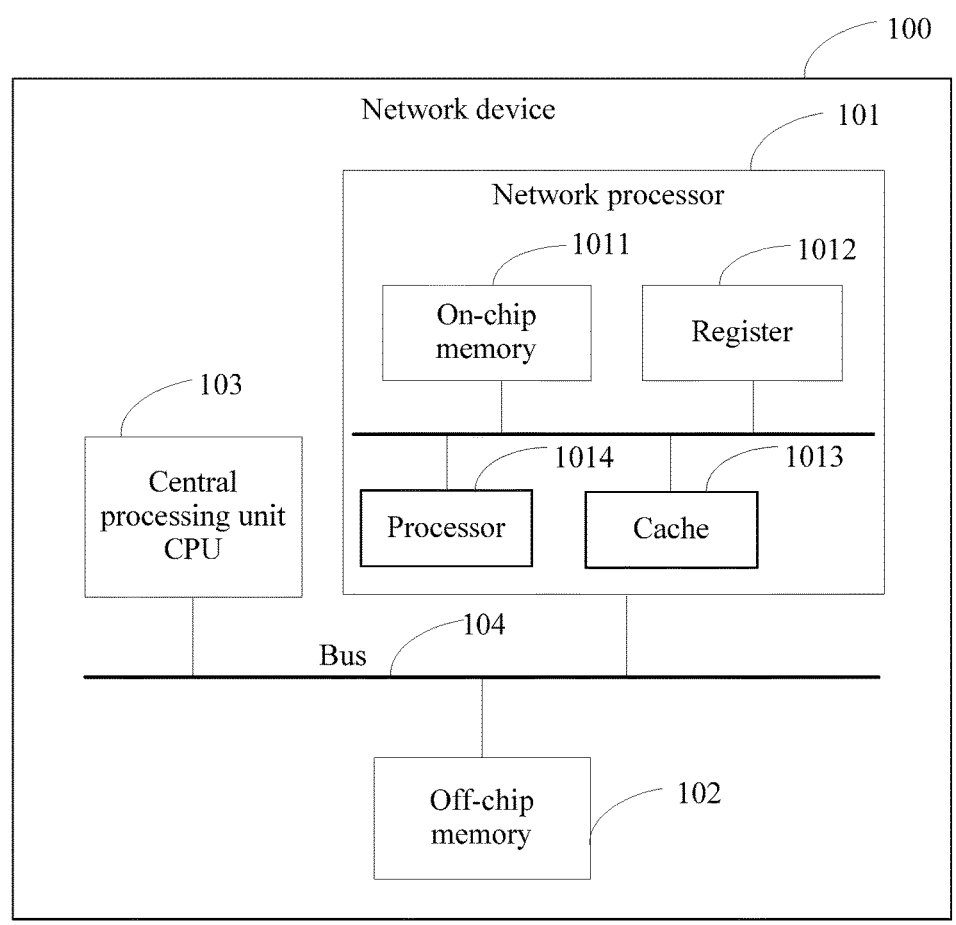
FIG. 11 is a structural diagram of a network device according to an embodiment of the present disclosure.

Referring to FIG. 11, an embodiment of the present disclosure provides a network device 100, which may include a network processor 101, an off-chip memory 102, a CPU 103, and a bus 104. The network device 100 herein may be a switch, a router, a bridge, or the like. The bus 104 is configured to connect the network processor 101, the off-chip memory 102, and the CPU 103. The network processor 101 includes an on-chip memory 1011, a register 1012, a cache 1013, and a processor 1014. A FIB on the network device 100 is of a Btree structure and includes a non-leaf node and a leaf node, where the non-leaf node is used to store a Key, the leaf node is used to store AD corresponding to the Key, a storage location of the FIB includes the on-chip memory 1011 of the network processor 101 and the off-chip memory 102 in the network device, the off-chip memory 102 stores n+1 stages with sequence numbers being from 0 to n, each stage includes k branches of nodes, n is an integer greater than or equal to 0, k is a positive integer, and nodes corresponding to a same storage address in each stage are one node block.

In the network device 100 provided in this embodiment of the present disclosure, the CPU 103 may be configured to send a write AD request used to modify the AD and a write Key request used to modify the Key corresponding to the AD to the network processor 101, where the write AD request carries a row address of a node block on which the AD is located, the write Key request carries a row address of a node block on which the Key is located, and the row address of the node block on which the Key is located and the row address of the node block on which the AD is located are not in a same stage.

The network processor 101 may be configured to receive the write AD request used to modify the AD corresponding to the Key and the write Key request used to modify the Key, where the write AD request and the write Key request are sent by the CPU 103.

The network processor 101 may be further configured to: when any one stage is to be read and written, and before the write AD request and the write Key request pass through the cache 1013, transform, when the any one stage to be read and written includes the Key, the row address in the write AD request into a row address that is the same as the row address of the node block on which the Key is located, or transform, when the any one stage to be read and written does not include the Key, the row address in the write AD request and the row address in the write Key request into a same row address in the any one stage, in order to read and write the any one stage according to the same row address.

The cache 1013 herein may be a cache with a high speed. If the row addresses in the write AD request and the write Key request are not a same row address in a same stage, a scheduling mechanism of the cache may cause that responses to the write AD request and the write Key request that are sent to the cache in sequence cannot be returned in sequence.

In this embodiment of the present disclosure, optionally, when the network processor 101 is to read and write any one stage with a sequence number being m and m is greater than or equal to 0 and less than or equal to n, the transforming, when the any one stage to be read and written does not include the Key, the row address in the write AD request and the row address in the write Key request into a same row address in the any one stage includes shifting the row address of the node block on which the AD is located in the write AD request by k*(n−m) bits to the right to obtain a right-shifted row address in the write AD request, and storing, in the register 1012, the last k*(n−m) bits of the row address of the node block on which the AD is located, and replacing the row address in the write Key request with the right-shifted row address in the write AD request, and storing, in the register 1012, the row address, in the write Key request before replacement, of the node block on which the Key is located.

The processor 1014 of the network processor 101 may be configured to: after any one off-chip stage has been read and written, receive an AD response to the write AD request and a Key response to the write Key request, where the AD response and the Key response are returned by the cache.

In this embodiment of the present disclosure, optionally, the network processor 101 may be further configured to: when the any one stage has been read and written and the AD response to the write AD request and the Key response to the write Key request are returned, restore the row address in the write AD request and the row address in the write Key request that are obtained after transformation, in order to transform the row address in the write AD request and the row address in the write Key request into a same row address in a next stage according to the row addresses that are before transformation.

In this embodiment of the present disclosure, optionally, that the network processor 101 restores the row address in the write AD request and the row address in the write Key request that are obtained after transformation may include: reading the last k*(n−m) bits, stored in the register 1012 after right-shifting, of the row address of the node block on which the AD is located, and restoring, according to the last k*(n−m) bits of the row address of the node block on which the AD is located, the right-shifted row address in the write AD request into the row address, before right-shifting, of the node block on which the AD is located, and reading the row address, stored in the register 1012 before replacement, of the node block on which the Key is located, and restoring, according to the row address, before replacement, of the node block on which the Key is located, the row address after replacement in the write Key request into the row address, before replacement, of the node block on which the Key is located.

In this embodiment of the present disclosure, optionally, the network processor 101 may be further configured to: when a stage to be read and written includes the Key, execute, when the row address of the node block on which the Key is located is read and written, the write Key request to modify the Key, and if a response for reading and writing the stage with a sequence number being n−1 is returned and the row address that is obtained after transformation in the write AD request is restored into the row address, before transformation, of the node block on which the AD is located, trigger execution of the write AD request when the Key response is returned, so as to modify AD in the stage with a sequence number being n.

In addition, when a Key of a non-leaf node and its corresponding AD of a leaf node are in a same stage, that is, a stage n in the off-chip memory, the Key and its corresponding AD are located on a same node block and are corresponding to a storage address of the same node block. Therefore, the Key and its corresponding AD have a same row address of the same stage. A row address of a node block may be understood as a sequence number of a storage address corresponding to the node block, and a storage address of each node block may be obtained by means of calculation according to a row address of the node block. In this case, the CPU 103 of the network device 100 may send a read and write request to the network processor 101, in order to instruct to modify a Key and its corresponding AD in a same row address in the off-chip stage n. Reading and writing are started from a root node of the Btree according to the read and write request, all on-chip and off-chip stages are sequentially read and written, and when the off-chip stage n is read and written, the Key and its corresponding AD in this stage are modified.

This embodiment of the present disclosure provides a network device 100, which includes a network processor. In a case in which a row address of a node block on which a Key to be modified is located and a row address of a node block on which AD corresponding to the Key to be modified is located are not in a same stage, when any one stage is to be read and written, before a write AD request and a write Key request pass through a cache, and when the any one stage to be read and written includes the Key, the row address in the write AD request is transformed into a row address that is the same as the row address of the node block on which the Key is located, or when the any one stage to be read and written does not include the Key, the row address in the write AD request and the row address in the write Key request are transformed into a same row address in the any one stage, in order to read and write the any one stage according to the same row address. This can ensure that a write AD request and a write Key request that are sent to a cache in sequence can be saved in a queue corresponding to a same row address and then can be scheduled in sequence, and responses can be returned in sequence, so that a response to a write Key request for reading and writing a stage (n−1) is not returned before a response to a write AD request for reading and writing the stage (n−1), and then, the write AD request may, after the response to the write AD request is returned, wait for the response to the write Key request to be returned, in order to be triggered by the response to the write Key request to modify AD in a stage n, and therefore, the write AD request can be executed in a process in which a Btree is read and written according to the write Key request, thereby ensuring that a Key of a non-leaf node and AD of a corresponding leaf node can be modified synchronously. This avoids a problem of a route search error in the prior art that is caused when a non-leaf node and a corresponding leaf node cannot be modified synchronously because responses to commands that are sent to a cache cannot be returned in sequence.

In the several embodiments provided in this application, it should be understood that the disclosed network processor and method may be implemented in other manners. For example, the described device embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

In addition, functional units in the devices and systems in the embodiments of the present disclosure may be integrated into one processing unit, or each of the units may exist alone physically, or two or more units are integrated into one unit. The units may be implemented in a form of hardware, or may be implemented in a form of hardware in addition to a software functional unit.

All or some of the steps of the foregoing method embodiments may be implemented by a program instructing relevant hardware. The foregoing program may be stored in a computer-readable storage medium. When the program runs, the steps of the foregoing method embodiments are performed. The foregoing storage medium includes: any medium that can store program code, such as a universal serial bus (USB) flash drive, a removable hard disk, a read-only memory (ROM), a random access memory (RAM), a magnetic disk, or an optical disc.

The foregoing descriptions are merely specific implementation manners of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A method for reading and writing a forwarding information base (FIB), wherein the FIB is of a binary search tree (Btree) structure and comprises a non-leaf node and a leaf node, wherein the non-leaf node is used to store a keyword (Key), wherein the leaf node is used to store associated data (AD) corresponding to the Key, wherein a storage location of the FIB comprises an on-chip memory and an off-chip memory, wherein the off-chip memory stores n+1 stages with sequence numbers being from 0 to n, wherein each stage comprises k branches of nodes, wherein n is an integer greater than or equal to 0, wherein k is a positive integer, wherein the nodes corresponding to a same storage address in each stage are one node block, and wherein the method comprises:

receiving, by a network processor (NP), a write AD request used to modify the AD and a write Key request used to modify the Key corresponding to the AD, wherein the write AD request and the write Key request are sent by a central processing unit (CPU) of a network device on which the NP is located, wherein the write AD request carries a row address of a node block on which the AD is located, wherein the write Key request carries a row address of a node block on which the Key is located, and wherein the row address of the node block on which the Key is located and the row address of the node block on which the AD is located are not in a same stage; and transforming, when any one stage to be read and written comprises the Key, the row address in the write AD request into another row address that is same as the row address of the node block on which the Key is located, when the any one stage is to be read and written, and before the write AD request and the write Key request pass through a cache; and transforming, when the any one stage to be read and written does not comprise the Key, the row address in the write AD request and the row address in the write Key request into same row address in the any one stage, when the any one stage is to be read and written, and before the write AD request and the write Key request pass through the cache, in order to read and write the any one stage according to the same row address.

2. The method according to claim 1, wherein when any one stage with a sequence number being m is to be read and written and m is greater than or equal to 0 and less than or equal to n, the transforming, when the any one stage to be read and written does not comprise the Key, the row address in the write AD request and the row address in the write Key request into a same row address in the any one stage comprises:

shifting, by the NP, the row address of the node block on which the AD is located in the write AD request by k*(n−m) bits to the right to obtain a right-shifted row address in the write AD request;

storing, in a register, the last k*(n−m) bits of the row address of the node block on which the AD is located;

replacing, by the NP, the row address in the write Key request with the right-shifted row address in the write AD request; and saving, in the register, the row address, in the write Key request before replacement, of the node block on which the Key is located.

3. The method according to claim 2, further comprising restoring, by the NP, the row address in the write AD request and the row address in the write Key request that are obtained after transformation, when the any one stage has been read and written and an AD response to the write AD request and a Key response to the write Key request are returned, in order to transform the row address in the write AD request and the row address in the write Key request into same row address in a next stage.

4. The method according to claim 3, wherein restoring, by the NP, the row address in the write AD request and the row address in the write Key request that are obtained after transformation comprises:
reading, by the NP, the last $k*(n-m)$ bits, stored in the register after right-shifting, of the row address of the node block on which the AD is located;
restoring, according to the last $k*(n-m)$ bits of the row address of the node block on which the AD is located, the right-shifted row address in the write AD request into the row address, before right-shifting, of the node block on which the AD is located;
reading, by the NP, the row address, stored in the register before replacement, of the node block on which the Key is located; and
restoring, according to the row address, before replacement, of the node block on which the Key is located, the row address after replacement in the write Key request into the row address, before replacement, of the node block on which the Key is located.

5. The method according to claim 3, further comprising:
executing, by the NP when the row address of the node block on which the Key is located is read and written, the write Key request to modify the Key when a stage to be read and written comprises the Key; and
triggering, by the NP, execution of the write AD request when the Key response is returned, in order to modify the AD in the stage with a sequence number being n when a response for reading and writing the stage with a sequence number being n−1 is returned and the row address that is obtained after transformation in the write AD request is restored into the row address, before transformation, of the node block on which the AD is located.

6. A network processor, wherein a forwarding information base (FIB) on the network processor is a binary search tree (Btree) structure and comprises a non-leaf node and a leaf node, wherein the non-leaf node is used to store a keyword (Key), wherein the leaf node is used to store associated data (AD) corresponding to the Key, wherein a storage location of the FIB comprises an on-chip memory and an off-chip memory, wherein the off-chip memory stores n+1 stages with sequence numbers being from 0 to n, wherein each stage comprises k branches of nodes, wherein n is an integer greater than or equal to 0, wherein k is a positive integer, wherein nodes corresponding to a same storage address in each stage are one node block, and wherein the network processor comprises:
a receiver configured to receive a write AD request used to modify the AD and a write Key request used to modify the Key corresponding to the AD, wherein the write AD request and the write Key request are sent by a central processing unit (CPU) of a network device on which the network processor is located, wherein the write AD request carries a row address of a node block on which the AD is located, wherein the write Key request carries a row address of a node block on which the Key is located, and wherein the row address of the node block on which the Key is located and the row address of the node block on which the AD is located are not in a same stage; and
a transformer configured to:
transform, when any one stage to be read and written comprises the Key, the row address in the write AD request into another row address that is same as the row address of the node block on which the Key is located, when the any one stage is to be read and written, and before the write AD request and the write Key request pass through a cache; and
transform, when the any one stage to be read and written does not comprise the Key, the row address in the write AD request and the row address in the write Key request into a same row address in the any one stage, in order to read and write the any one stage according to the same row address when the any one stage is to be read and written, and before the write AD request and the write Key request pass through the cache.

7. The network processor according to claim 6, wherein the transformer is further configured to:
shift the row address of the node block on which the AD is located in the write AD request by $k*(n-m)$ bits to the right to obtain a right-shifted row address in the write AD request; and
replace the row address in the write Key request with the right-shifted row address in the write AD request,
wherein the network processor further comprises a memory configured to:
store the last $k*(n-m)$ bits of the row address of the node block on which the AD is located after the transformer shifts the row address of the node block on which the AD is located in the write AD request by $k*(n-m)$ bits to the right to obtain the right-shifted row address in the write AD request; and
store the row address, in the write Key request before replacement, of the node block on which the Key is located after the transformer replaces the row address in the write Key request with the right-shifted row address in the write AD request.

8. The network processor according to claim 7, further comprising a restorer configured to restore the row address in the write AD request and the row address in the write Key request that are obtained after transformation, when the any one stage has been read and written and an AD response to the write AD request and a Key response to the write Key request are returned, in order to transform the row address in the write AD request and the row address in the write Key request into a same row address in a next stage.

9. The network processor according to claim 8, wherein the restorer is further configured to:
read the last $k*(n-m)$ bits, stored in the memory after right-shifting, of the row address of the node block on which the AD is located;
restore, according to the last $k*(n-m)$ bits of the row address of the node block on which the AD is located, the right-shifted row address in the write AD request into the row address, before right-shifting, of the node block on which the AD is located;
read the row address, stored in the memory before replacement, of the node block on which the Key is located; and
restore, according to the row address, before replacement, of the node block on which the Key is located, the row address after replacement in the write Key request into the row address, before replacement, of the node block on which the Key is located.

10. The network processor according to claim 8, further comprising a modifier configured to:

execute, wherein the row address of the node block on which the Key is located is read and written, the write Key request to modify the Key when a stage to be read and written comprises the Key; and trigger execution of the write AD request when the Key response is returned, in order to modify the AD in the stage with a sequence number being n, when a response for reading and writing the stage with a sequence number being n−1 is returned and the row address that is obtained after transformation in the write AD request is restored into the row address, before transformation, of the node block on which the AD is located.

\* \* \* \* \*